(12) United States Patent
Arai et al.

(10) Patent No.: US 10,656,485 B2
(45) Date of Patent: May 19, 2020

(54) DISPLAY DEVICE AND METHOD FOR MANUFACTURING THE SAME

(71) Applicant: Panasonic Liquid Crystal Display Co., Ltd., Himeji-shi, Hyogo (JP)

(72) Inventors: Takeshi Arai, Hyogo (JP); Tatsuya Kawasaki, Nara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/202,978

(22) Filed: Nov. 28, 2018

(65) Prior Publication Data

US 2019/0235329 A1 Aug. 1, 2019

(30) Foreign Application Priority Data

Jan. 31, 2018 (JP) ................. 2018-015421

(51) Int. Cl.
*G02F 1/1362* (2006.01)
*G02F 1/1335* (2006.01)
(Continued)

(52) U.S. Cl.
CPC .. *G02F 1/136259* (2013.01); *G02F 1/136286* (2013.01); *G09G 3/3648* (2013.01); *G02F 1/133512* (2013.01); *G02F 1/133514* (2013.01); *G02F 1/133611* (2013.01); *G02F 2201/121* (2013.01); *G02F 2201/123* (2013.01);
(Continued)

(58) Field of Classification Search
CPC .... G01N 21/88; G01N 21/8851; G01N 25/72; G02F 1/136259; G02F 1/136286; G02F 1/1335; G02F 1/133514; G02F 1/133512; G02F 1/133509; G02F 1/133707; G02F 1/134309; G02F 1/1309; G02F 1/1343; G02F 1/133611; G02F 2201/508; G02F 2201/121; G02F 2201/123; G02F 2001/134345; G02F 2001/136263; G02F 2001/136268; G02F 2001/133562; G02F 2001/13356; G02F 2202/40; G09G 3/006; G09G 3/3648; G09G 2320/0233; G09G 2320/0626
See application file for complete search history.

(56) References Cited

U.S. PATENT DOCUMENTS

2006/0126003 A1\* 6/2006 Yoo ................. G02F 1/136259
349/192
2018/0261168 A1 9/2018 Mori et al.

FOREIGN PATENT DOCUMENTS

JP 2017-151414 8/2017
WO 2017/043029 3/2017

\* cited by examiner

*Primary Examiner* — Thoi V Duong
(74) *Attorney, Agent, or Firm* — Hamre, Schumann, Mueller & Larson, P.C.

(57) ABSTRACT

A display device includes a first translucent substrate, a second translucent substrate that is disposed on a display surface side while opposed to the first translucent substrate, and a first light reduction unit that reduces a transmission amount of visible light while overlapping a bright point defect portion in planar view in at least one of the first translucent substrate and the second translucent substrate. The first light reduction unit has a circular shape including a first region disposed in a center and a second region disposed around the first region, and transmittance to the visible light in the first region is higher than transmittance to the visible light in the second region.

18 Claims, 15 Drawing Sheets

(51) Int. Cl.
*G09G 3/36* (2006.01)
*G02F 1/13357* (2006.01)
(52) U.S. Cl.
CPC ............... *G02F 2201/508* (2013.01); *G09G 2320/0233* (2013.01)

DISPLAY DEVICE AND METHOD FOR MANUFACTURING THE SAME

CROSS-REFERENCE TO RELATED APPLICATION

The present application claims priority from Japanese application JP 2018-015421 filed on Jan. 31, 2018, the content of which is hereby incorporated by reference into this application.

TECHNICAL FIELD

The present invention relates to a liquid crystal display device and a method of driving the liquid crystal display device.

BACKGROUND

For example, in a liquid crystal display device among various display devices, an electric field generated between a pixel electrode and a common electrode, which are formed in each pixel region, is applied to liquid crystal to drive the liquid crystal, thereby adjusting an amount of light transmitted through a region between the pixel electrode and the common electrode to display an image.

A known problem with for example, a conventionally liquid crystal display device, is so-called a bright point defect (also referred to as a pixel defect), in which display luminance of the pixel is higher than desired luminance may be generated in a process of manufacturing liquid crystal display device. The bright point defects is caused, for example, by mixing a foreign matter between a pair of substrates in the manufacturing process of the liquid crystal display device, and an alignment of the liquid crystal is confused, or the pixel electrodes and the common electrode are short-circuited by the foreign matter.

A prior art discloses a method for correcting the bright spot defect that laser light is irradiated inside the glass substrate to form light reduction unit so as to cover a region where the bright spot defect is generated in plan view, in order to decrease an amount of transmitting light transmitted (for example, see Unexamined Japanese Patent Publication No. 2017-151414).

However, when the light reduction unit is formed to cover the region where the bright point defect is generated, for example, in the case that the light reduction unit is formed by irradiating the translucent substrate with the laser beam while scanning the translucent substrate with the laser beam, distortion is generated in a region where a scanning direction is turned back in the translucent substrate, and the light may leak from the distortion.

The present disclosure is made in view of the above-described circumstances, and an object of the present disclosure is to provide a display device in which degradation of display quality due to the bright point defect is prevented and a method for manufacturing a display device.

SUMMARY

In one general aspect, the instant application describes a display device including a first translucent substrate, a second translucent substrate that is disposed on a display surface side while opposed to the first translucent substrate, and a first light reduction unit that reduces a transmission amount of visible light while overlapping a bright point defect portion in planar view in at least one of the first translucent substrate and the second translucent substrate. The first light reduction unit has a circular shape including a first region disposed in a center and a second region disposed around the first region, and transmittance to the visible light in the first region is higher than transmittance to the visible light in the second region.

The above general aspect may include one or more of the following features. The second region may include a spiral first low transmittance region. The transmittance to the visible light in the first low transmittance region may be lower than the transmittance to the visible light in other regions of the second region.

The display device may further includes a second light reduction unit that is provided in the second translucent substrate to reduce the transmission amount of the visible light. The first light reduction unit is provided in the second translucent substrate. The second light reduction unit may has a circular shape including a third region disposed in the center and a fourth region disposed around the third region. The transmittance to the visible light in the third region may be higher than the transmittance to the visible light in the fourth region. The first region and the fourth region may overlap each other in planar view while the second region and the third region may overlap each other in planar view.

The second region may include a spiral first low transmittance region. The fourth region may include a spiral second low transmittance region. The transmittance to the visible light in the first low transmittance region may be lower than the transmittance to the visible light in other regions of the second region. The transmittance to the visible light in the second low transmittance region may be lower than the transmittance to the visible light in other regions of the fourth region.

The display device may further include a second light reduction unit that is provided in the second translucent substrate to reduce the transmission amount of the visible light. The first light reduction unit may be provided in the second translucent substrate. The second light reduction unit may has a circular shape including a third region disposed in the center and a fourth region disposed around the third region. The transmittance to the visible light in the fourth region may be higher than the transmittance to the visible light in the third region. The second light reduction unit may overlap at least a part of the first light reduction unit in planar view.

The first light reduction unit may be disposed closer to the display surface side than the second light reduction unit. A diameter of the first light reduction unit may be larger than a diameter of the second light reduction unit.

The second light reduction unit may be disposed closer to the display surface side than the first light reduction section. A diameter of the second light reduction unit may be larger than a diameter of the first light reduction unit.

The second region may include a spiral first low transmittance region. The third region may include a spiral second low transmittance region. The transmittance to the visible light in the first low transmittance region may be lower than the transmittance to the visible light in other regions of the second region. The transmittance to the visible light in the second low transmittance region may be lower than the transmittance to the visible light in other regions of the third region.

The first region and the third region may overlap each other in planar view.

The display device may further include a liquid crystal layer that is disposed between the first translucent substrate and the second translucent substrate and includes the bright point defect portion.

In another general aspect, a method for manufacturing a display device of the instant application, the display device including a first translucent substrate and a second translucent substrate that is disposed on a display surface side while opposed to the first translucent substrate, the method including a detection step of detecting a bright point defect portion of a pixel by performing lighting inspection of the display device, and a first irradiation step of performing irradiation of an energy beam focused on an inside of at least one of the first translucent substrate and the second translucent substrate. In the first irradiation step, a circular first light reduction unit that covers the bright point defect portion when the first light reduction unit is viewed from a display surface side is formed by performing spiral scanning with the energy beam.

The above general aspect may include one or more of the following features. In the first irradiation step, the scanning may be performed with the energy beam from an outer circumferential side to an inner circumferential side.

The method may further include a second irradiation step of performing irradiation of the energy beam focused on an inside of the second translucent substrate while performing the spiral scanning with the energy beam, and forming a second light reduction unit. In the first irradiation step, the irradiation of the energy beam may be performed such that the energy beam is focused on the inside of the second translucent substrate. A focal position of the energy beam in the first irradiation step may be closer to the display surface side than a focal position of the energy beam in the second irradiation step. The first light reduction unit may overlap at least a part of the second light reduction unit in planar view.

In the second irradiation step, scanning may be performed with the energy beam from an outer circumferential side to an inner circumferential side. An irradiation end position in the first irradiation step and an irradiation end position in the second irradiation step may not overlap each other in planar view.

In the second irradiation step, scanning may be performed with the energy beam from an inner circumferential side to an outer circumferential side.

The focal position of the energy beam in the first irradiation step may be closer to the display surface side than the focal position of the energy beam in the second irradiation step. A diameter of the first light reduction unit may be larger than a diameter of the second light reduction unit.

The focal position of the energy beam in the second irradiation step may be closer to the display surface side than the focal position of the energy beam in the first irradiation step. A diameter of the second light reduction unit may be larger than a diameter of the first light reduction unit.

The first irradiation step may includes a first intensity irradiation step of performing irradiation of the energy beam having first irradiation intensity, and a second intensity irradiation step of performing irradiation of the energy beam having second irradiation intensity weaker than the first irradiation intensity after the first intensity irradiation step.

According to the display device of the present disclosure, the deterioration of display quality due to the bright point defect can be prevented.

DETAILED DESCRIPTION

Exemplary embodiments of the present invention will be described below with reference to the accompanying drawings. The embodiment of the present application takes a liquid crystal display device as an example of a display device of the present application. However, the present application is not limited thereto, but the display device may be another kind of display, such as an organic EL display or a plasma display.

[Liquid Crystal Display Device]

Figure 1:
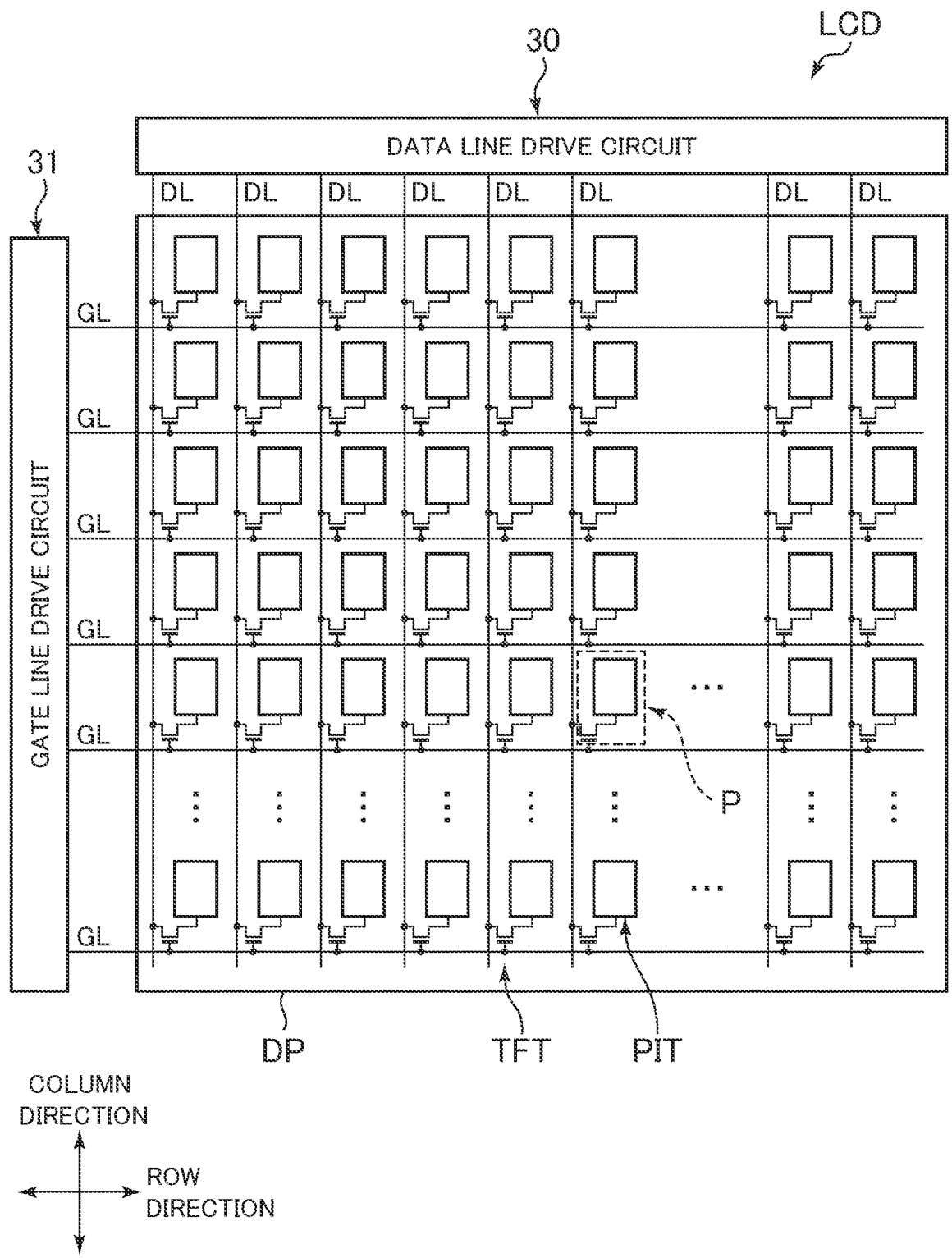
FIG. 1 is a plan view illustrating an overall configuration of liquid crystal display device according to an exemplary embodiment.

FIG. 1 is a plan view illustrating an overall configuration of liquid crystal display device LCD according to the exemplary embodiment of the present disclosure. Liquid crystal display device LCD includes display panel DP that displays an image, a display panel driving circuit (data line driving circuit 30, gate line driving circuit 31) that drives display panel DP, a control circuit (not illustrated) that controls the display panel driving circuit, and backlight 134 that emits backlight light to display panel DP from a rear surface side.

Figure 2:
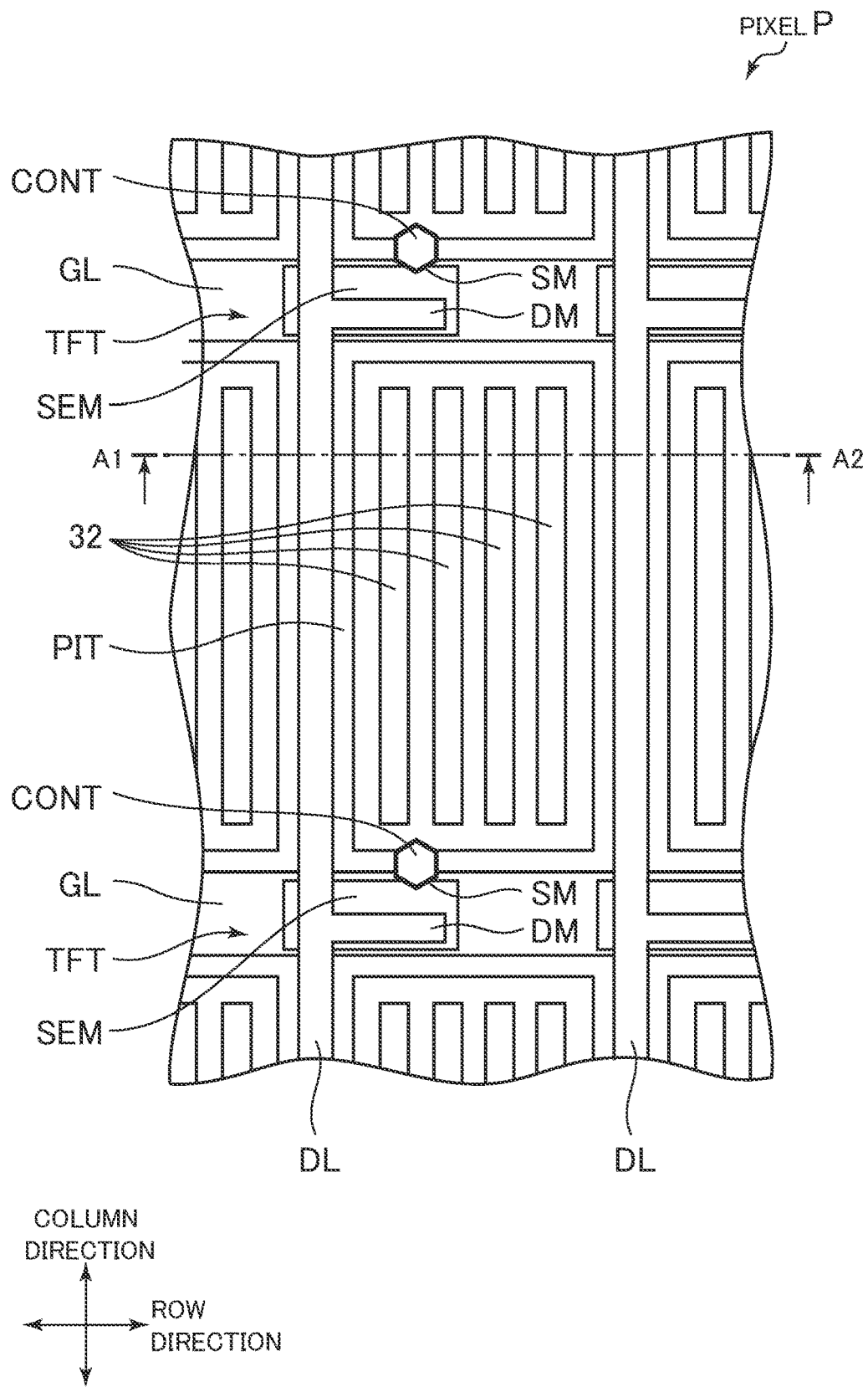
FIG. 2 is a plan view illustrating a configuration of a part of display panel in the liquid crystal display device shown in FIG. 1.
Figure 3:
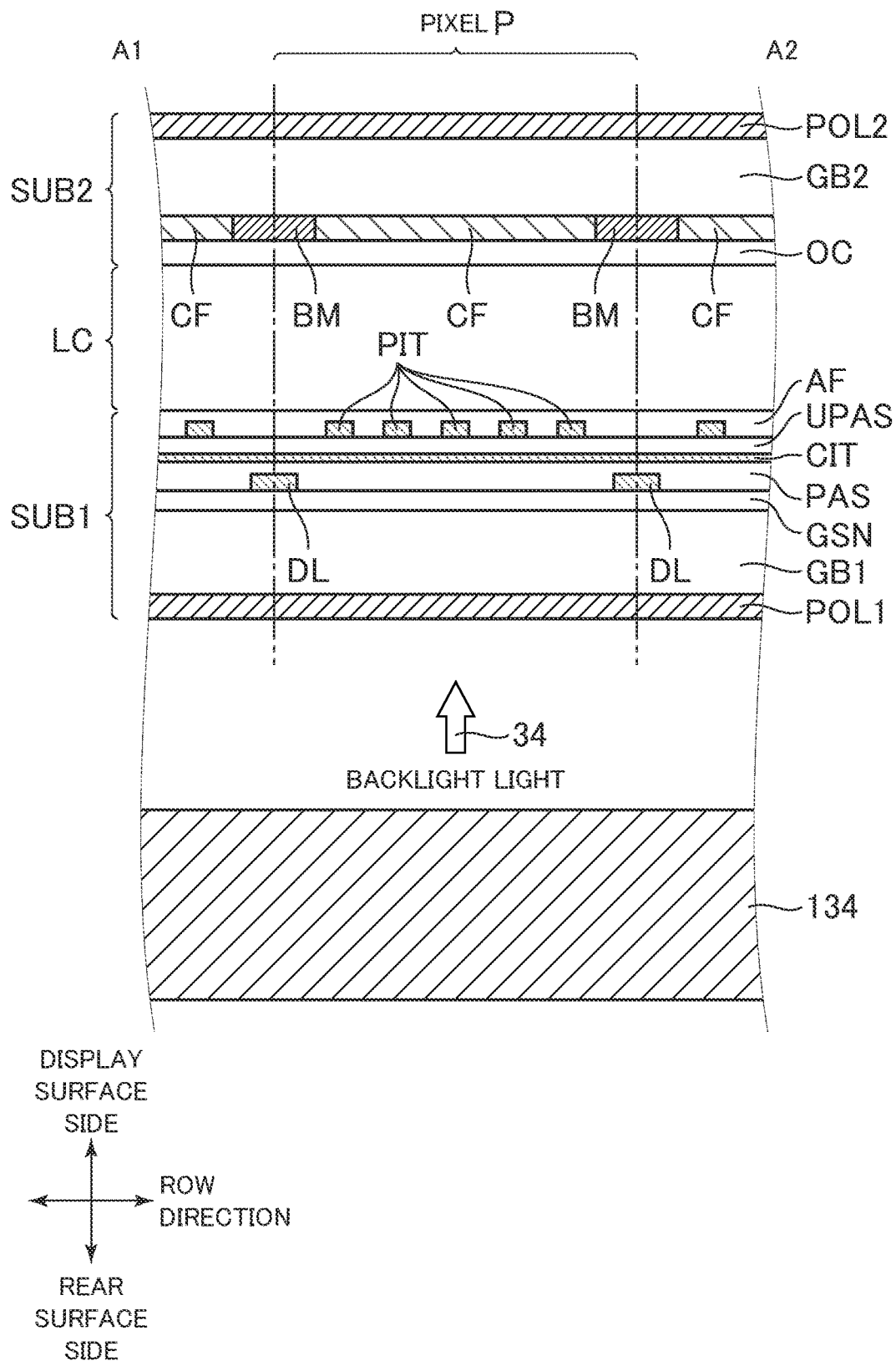
FIG. 3 is an end view of a cut portion taken along line A1-A2 in FIG. 2.

FIG. 2 is a plan view illustrating a configuration of a part of display panel DP. FIG. 3 is an end view of a cut portion taken along line A1-A2 in FIG. 2. FIGS. 2 and 3 illustrate one pixel P.

Display panel DP includes thin film transistor substrate SUB1 (hereinafter, referred to as TFT substrate SUB1) disposed on the rear surface side, color filter substrate SUB2 (hereinafter, referred to as CF substrate SUB2) that is disposed on a display surface side while opposed to TFT substrate SUB1), and liquid crystal layer LC sandwiched between TFT substrate SUB1 and CF substrate SUB2.

In TFT substrate SUB1, a plurality of data lines DL extending in a column direction and a plurality of gate lines GL extending in a row direction are formed, and thin film transistor TFT is formed near an intersection of each of the plurality of data lines DL and each of the plurality of gate lines GL. A rectangular region surrounded by two adjacent data lines DL and two adjacent gate lines GL is defined as one pixel P. A plurality of pixels P are arranged in a matrix on TFT substrate SUB1.

Pixel electrode PIT (display electrode) made of a transparent (translucent) conductive film such as indium tin oxide (ITO) is formed in pixel P. As illustrated in FIG. 2, pixel electrode PIT includes opening 32 (for example, a slit), and is formed into a stripe shape. In thin film transistor TFT, semiconductor layer SEM made of amorphous silicon (a-Si) is formed on gate insulator GSN (see FIG. 3), and drain electrode DM and source electrode SM are formed on semiconductor layer SEM (see FIG. 2). Drain electrode DM is electrically connected to data line DL. Source electrode SM and pixel electrode PIT are electrically connected to each other through contact hole CONT.

A laminated structure of each unit constituting pixel P is not limited to the configurations in FIG. 3, but any known configuration can be applied. For example, in the configuration of FIG. 3, in TFT substrate SUB1, gate line GL (see FIG. 2) is formed on first glass substrate GB1 (first translucent substrate), and the gate insulator GSN is formed so as to cover gate line GL. Data line DL is formed on gate insulator GSN, and insulator PAS is formed so as to cover data line DL. Common electrode CIT (display electrode) is formed on insulator PAS, and an upper insulator UPAS is formed so as to cover common electrode CIT. Further, pixel electrode PIT is formed on upper insulator UPAS, and alignment film AF is formed so as to cover pixel electrode PIT. First polarizing plate POL1 is formed on the rear surface side of first glass substrate GB1.

In CF substrate SUB2 of FIG. 3, black matrix BM (light shielding unit) and color filter CF (for example, a red portion, a green portion, and a blue portion) (light transmission unit) are formed on a lower surface side of second glass substrate GB2 (second translucent substrate), and overcoat layer OC is formed so as to cover black matrix BM and color filter CF. Second polarizing plate POL2 is formed on the display surface side of second glass substrate GB2. Thus, second glass substrate GB2 is located on the display surface side while opposed to first glass substrate GB1, and liquid crystal layer LC is located between first glass substrate GB1 and second glass substrate GB2.

According to the configuration in FIG. 3, liquid crystal display device LCD has what is called an IPS (In Plane Switching) system, but liquid crystal display device LCD of the exemplary embodiment is not limited this configuration.

A method for driving liquid crystal display device LCD will briefly be described below. A scanning gate voltage output from gate line driving circuit 31 is supplied to gate line GL, and a video data voltage outputted from data line driving circuit 30 is supplied to data line DL. When a gate-on voltage is supplied to gate line GL, semiconductor layer SEM of thin film transistor TFT becomes low resistance, and the data voltage supplied to data line DL is supplied to pixel electrode PIT through source electrode SM. A common voltage output from a common electrode driving circuit (not illustrated) is supplied to common electrode CIT. Consequently, an electric field (driving electric field) is generated between pixel electrode PIT and common electrode CIT, and liquid crystal layer LC is driven by the electric field to display an image.

Figure 4:
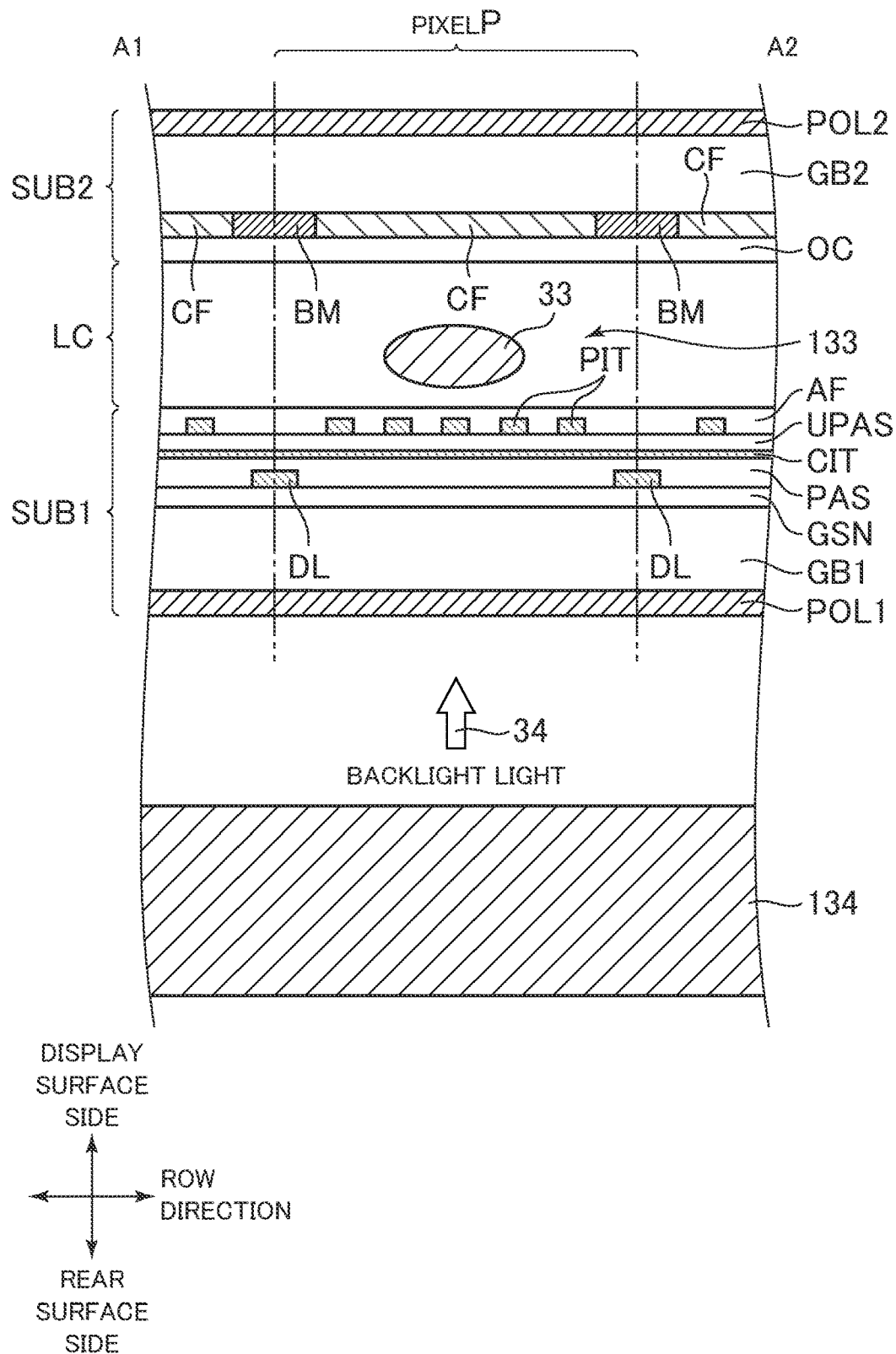
FIG. 4 illustrates a cross section schematic view of an example of a bright point defect unit in the liquid crystal display device shown in FIG. 1.

At this point, the bright point defect (pixel defect) in which display luminance of the pixel is higher than desired luminance may be generated in a process of manufacturing liquid crystal display device LCD. FIG. 4 illustrates an example of the case that pixel P becomes bright point defect unit 133. FIG. 4 exemplifies the case that foreign matter 33 such as an organic substance and metal is mixed between TFT substrate SUB1 and CF substrate SUB2 in the process of manufacturing liquid crystal display device LCD. In pixel P of FIG. 4, alignment of the liquid crystal is confused by the foreign matter (contaminant) 33, and light leakage of backlight light 34 is generated to form bright point defect portion 133 having the bright point defect.

Figure 5:
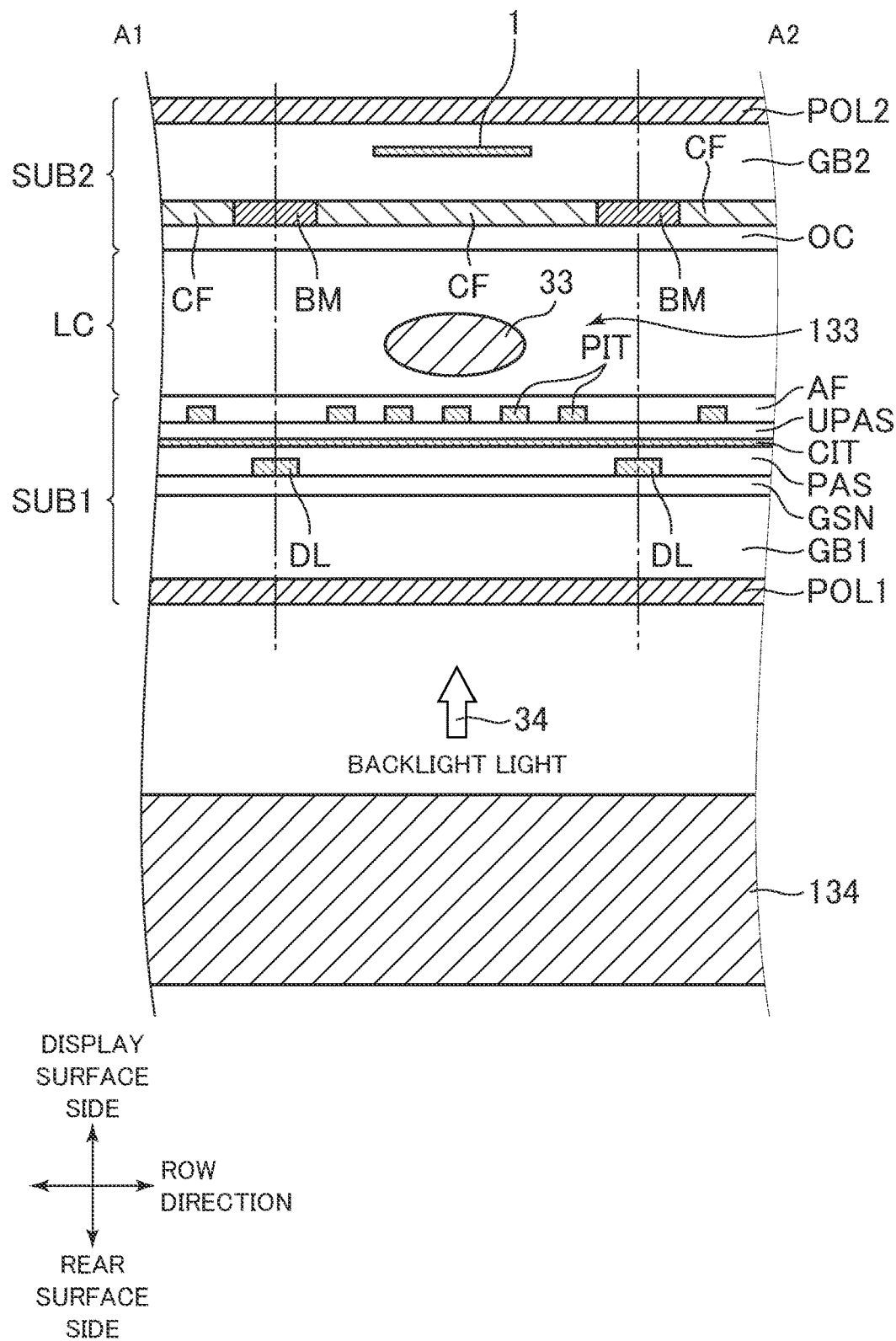
FIG. 5 illustrates a cross section view of pixels including a light reduction unit in liquid crystal display device according to the exemplary embodiment.

Liquid crystal display device LCD of the exemplary embodiment has a configuration that prevents the bright point defect. Specifically, as illustrated in FIG. 5, first light reduction unit 1 that decreasing an amount of visible light transmitted through backlight light 34 is formed in second glass substrate GB2 of CF substrate SUB2.

First light reduction unit 1 is disposed so as to overlap bright point defect portion 133 in planar view. In the exemplary embodiment, the first light reduction unit 1 is formed so as to cover bright point defect portion 133 caused by foreign matter 33 when viewed from the display surface side of second glass substrate GB2. That is, when being viewed from the display surface side, the first light reduction unit 1 covers bright point defect portion 133 in at least one of first glass substrate GB1 and second glass substrate GB2.

Figure 6:
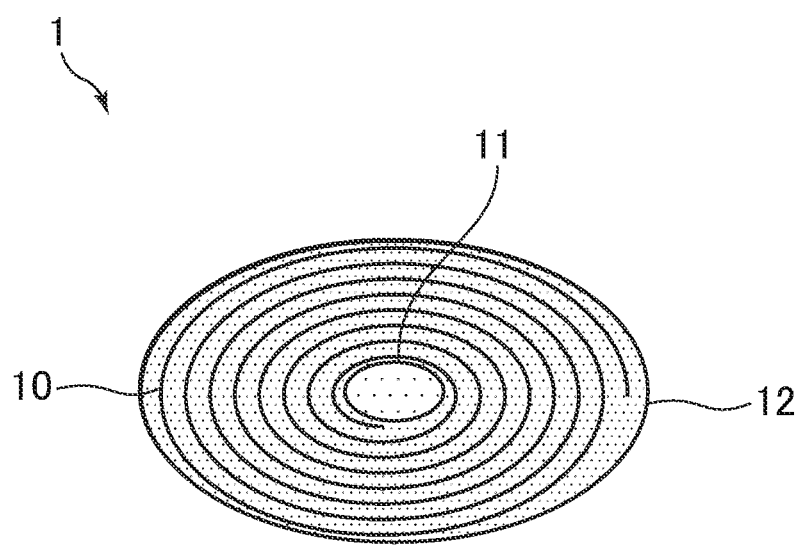
FIG. 6 is a schematic perspective view illustrating the light reduction unit of the exemplary embodiment.

FIG. 6 is a schematic perspective view illustrating first light reduction unit 1 of the exemplary embodiment. In the exemplary embodiment, first light reduction unit 1 has a circular shape. The circular shape includes not only a true circle but also an ellipse and the like. Circular first light reduction unit 1 includes first region 11 disposed in the center and second region 12 disposed around first region 11. An area of first region 11 disposed in the center is smaller than an area of second region 12.

In the exemplary embodiment, transmittance to the visible light in first region 11 is higher than transmittance to the visible light in second region 12. First light reduction unit 1 of the exemplary embodiment further includes spiral first low transmittance region 10, and spiral first low transmittance region 10 is disposed in second region 12. First low transmittance region 10 has the lower transmittance to the visible light as compared with other regions in second region 12.

The irradiation of the laser beam is performed such that a focal point is formed within glass substrate GB, and the scanning is spirally performed with the laser beam from an outer circumferential side of first light reduction unit 1 to an inner circumferential side, which allows the formation of first light reduction unit 1 in FIG. 6. At this point, the irradiation of the laser beam is ended in first region 11 that is a central portion of first light reduction unit 1, so that the slight distortion is generated in first region 11. For this reason, the transmittance to the visible light in first region 11 is slightly higher than the transmittance to the visible light in second region 12.

The area of the region where the distortion is generated can be suppressed by adopting the configuration of the present disclosure. For example, after the scanning is performed with the laser beam in a first direction, the scanning direction with the laser beam is turned back in an opposite direction to the first direction, and the scanning with the laser beam is performed in the opposite direction. In repeating the scanning, the distortion is generated in all the turn-back regions relating to the scanning with the laser beam. On the other hand, by adopting the configuration of the present disclosure, the region where the distortion is generated can be concentrated in first region 11 that is the central region of the first light reduction unit. As a result, the degradation of the display quality due to the bright point defect can be prevented.

(First Modification)

Figure 7:
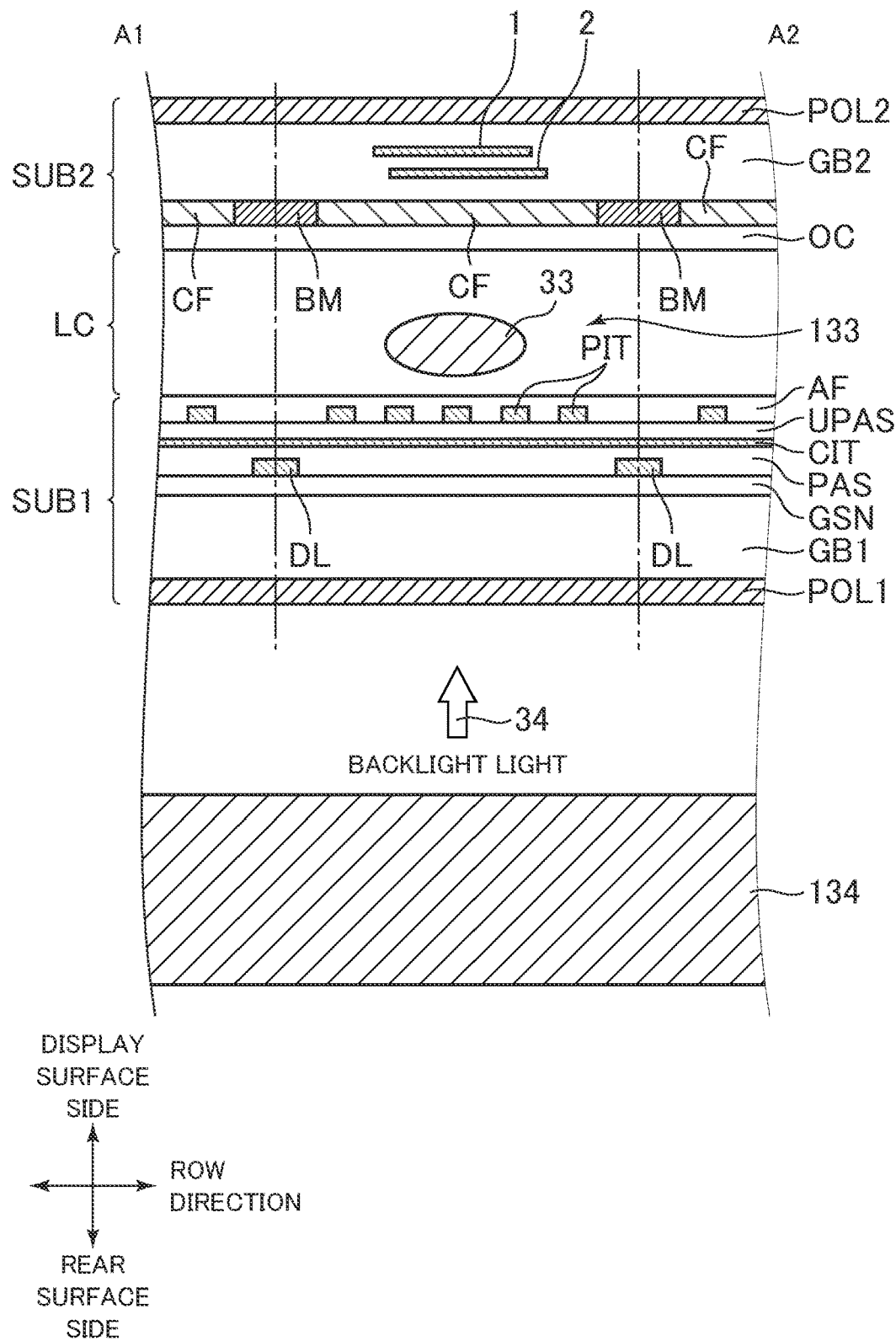
FIG. 7 illustrates a cross section view of pixels including a light reduction unit in liquid crystal display device according to first modification of the exemplary embodiment.

FIG. 7 illustrates another configuration that prevents the bright point defect in liquid crystal display device LCD according to a first modification of the exemplary embodiment.

In the first modification, second light reduction unit 2 is formed at a position (rear surface side) deeper than a focal position during the formation of first light reduction unit 1. Second light reduction unit 2 is planarly disposed, and formed so as to cover bright point defect portion 133 caused by foreign matter 33 when viewed from the display surface side of second glass substrate GB2. That is, second light reduction unit 2 that covers bright point defect portion 133 when viewed from the display surface side is disposed in at least one of first glass substrate GB1 and second glass substrate GB2. Second light reduction unit 2 reduces the amount of the visible light transmitted through backlight light 34.

Figure 8:
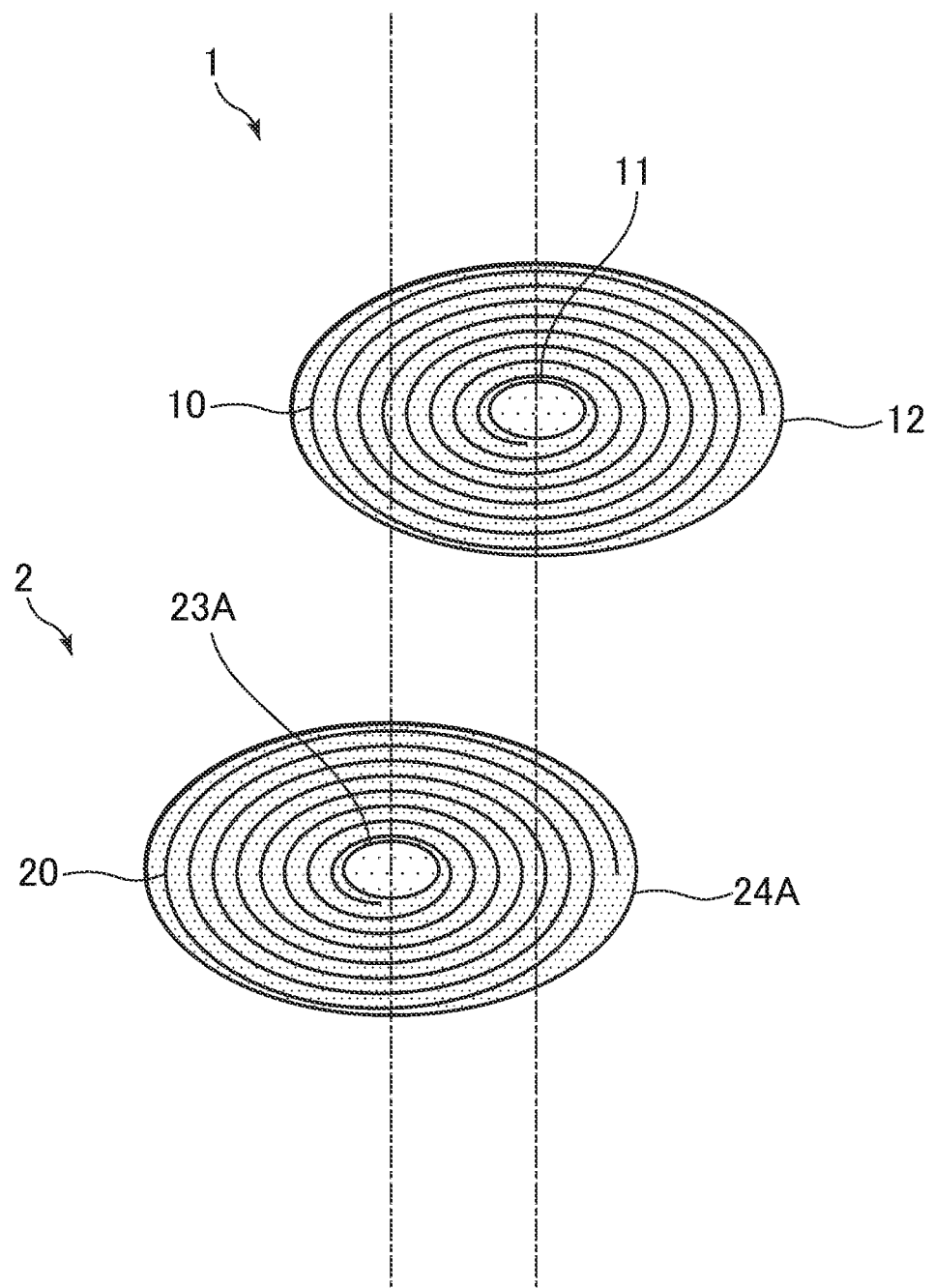
FIG. 8 is a schematic perspective view illustrating the light reduction unit of the first modification of the exemplary embodiment.

FIG. 8 is a schematic perspective view illustrating first light reduction unit 1 and second light reduction unit 2 of the first modification of the exemplary embodiment. In the first modification of FIG. 8, each of first light reduction unit 1 and second light reduction unit 2 has a circular shape. The circular shape includes not only a true circle but also an ellipse. Circular first light reduction unit 1 includes first region 11 disposed in the center and second region 12 disposed around first region 11. Similarly, circular second reduction unit 2 includes third region 23A disposed in the center and fourth region 24A disposed around third region 23A. Even in the first modification, in first light reduction unit 1, the area of first region 11 disposed in the center is smaller than the area of second region 12. Similarly, in second dimming section 2, the area of third region 23A disposed in the center is smaller than the area of fourth region 24A.

In the first modification, the transmittance to the visible light in first region 11 is higher than the transmittance to the visible light in second region 12. The transmittance to the visible light in third region 23A is higher than the transmittance to the visible light in fourth region 24A. First light reduction unit 1 of the first modification further includes spiral first low transmittance region 10, and spiral first low transmittance region 10 is disposed in second region 12. Similarly, second light reduction unit 2 includes spiral second low transmittance region 20, and spiral second low transmittance region 20 is disposed in fourth region 24A. Second low transmittance region 20 has lower transmittance to the visible light as compared with other regions in fourth region 24A.

As illustrated in FIG. 8, in the first modification, first light reduction unit 1 is disposed on the display surface side with respect to second light reduction unit 2, and a center axis of first light reduction unit 1 is disposed so as not to overlap a center axis of second light reduction unit 2 in planar view.

More specifically, in planar view, first region 11 of first light reduction unit 1 does not overlap third region 23A of second light reduction unit 2, first region 11 of first light reduction unit 1 overlaps fourth region 24A of second light reduction unit 2, and third region 23A of second light reduction unit 2 overlaps second region 12 of first light reduction unit 1.

The degradation of the display quality due to the bright point defects can further be prevented by adopting the configuration. That is, first region 11 of first light reduction unit 1 and third region 23A of second light reduction unit 2 may include the distortion, and first region 11 and third region 23A are higher than second region 12 and fourth region 24A in the transmittance to the visible light. For this reason, first region 11 having the higher transmittance and fourth region 24A having the transmittance lower than that of first region 11 overlap each other in planar view, and third region 23A having the higher transmittance and second region 12 having the transmittance lower than that of third region 23A overlap each other in planar view. With this configuration, the light generated due to bright point defect portion 133 can be prevented from exiting from first region 11 and third region 23A onto the display surface side.

(Second Modification)

Figure 9:
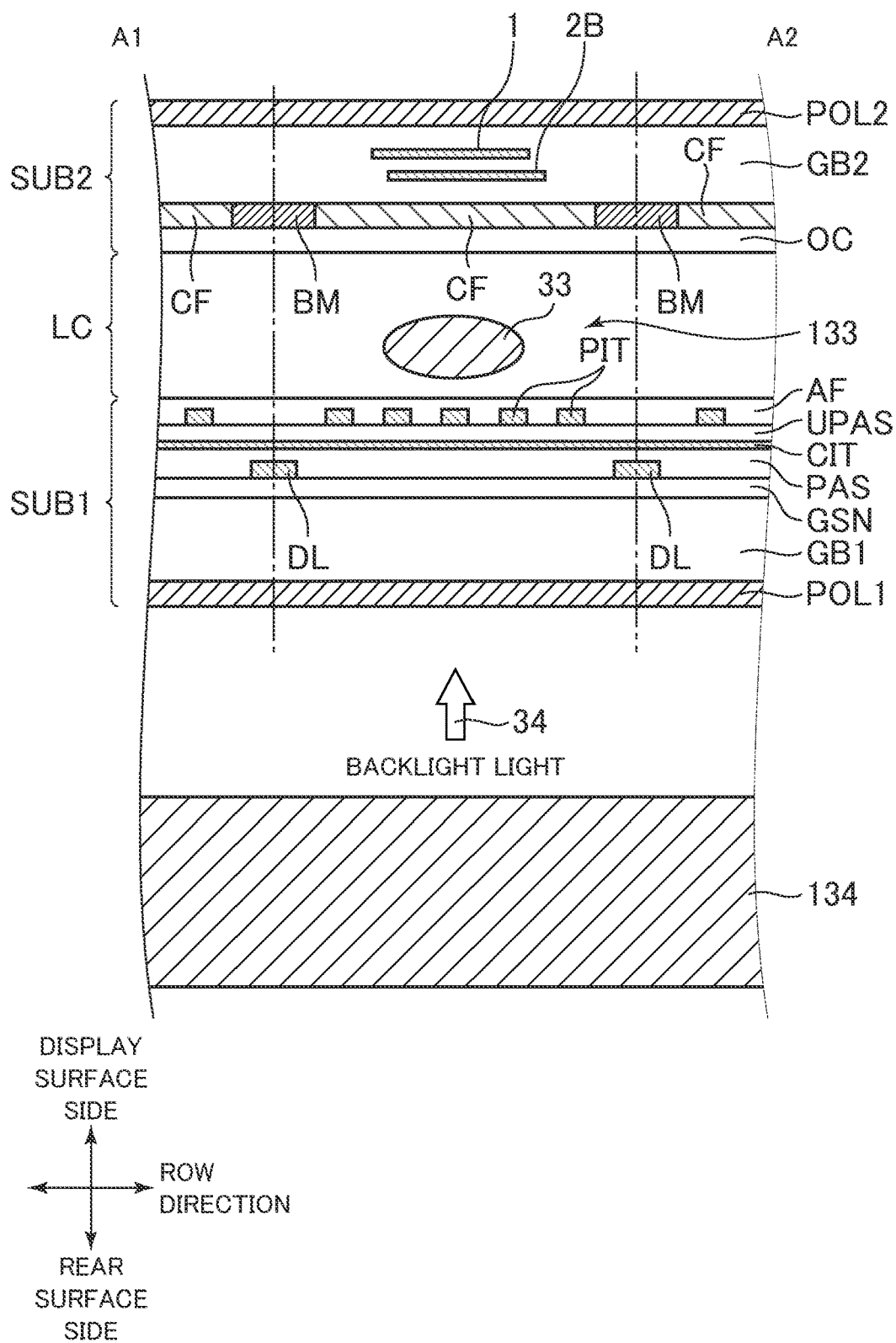
FIG. 9 illustrates a cross section view of pixels including a light reduction unit in liquid crystal display device according to second modification of the exemplary embodiment.

FIG. 9 illustrates another configuration that prevents the bright point defect in liquid crystal display device LCD according to a second modification of the exemplary embodiment.

In the second modification, second light reduction unit 2B is formed at a position (rear surface side) deeper than the focal position during the formation of first light reduction unit 1. Second light reduction unit 2B is planarly disposed, and formed so as to cover bright point defect portion 133 caused by foreign matter 33 when viewed from the display surface side of second glass substrate GB2. That is, second light reduction unit 2B that covers bright point defect portion 133 when viewed from the display surface side is disposed in at least one of first glass substrate GB1 and second glass substrate GB2. Second light reduction unit 2B reduces the amount of the visible light transmitted through backlight light 34.

Figure 10:
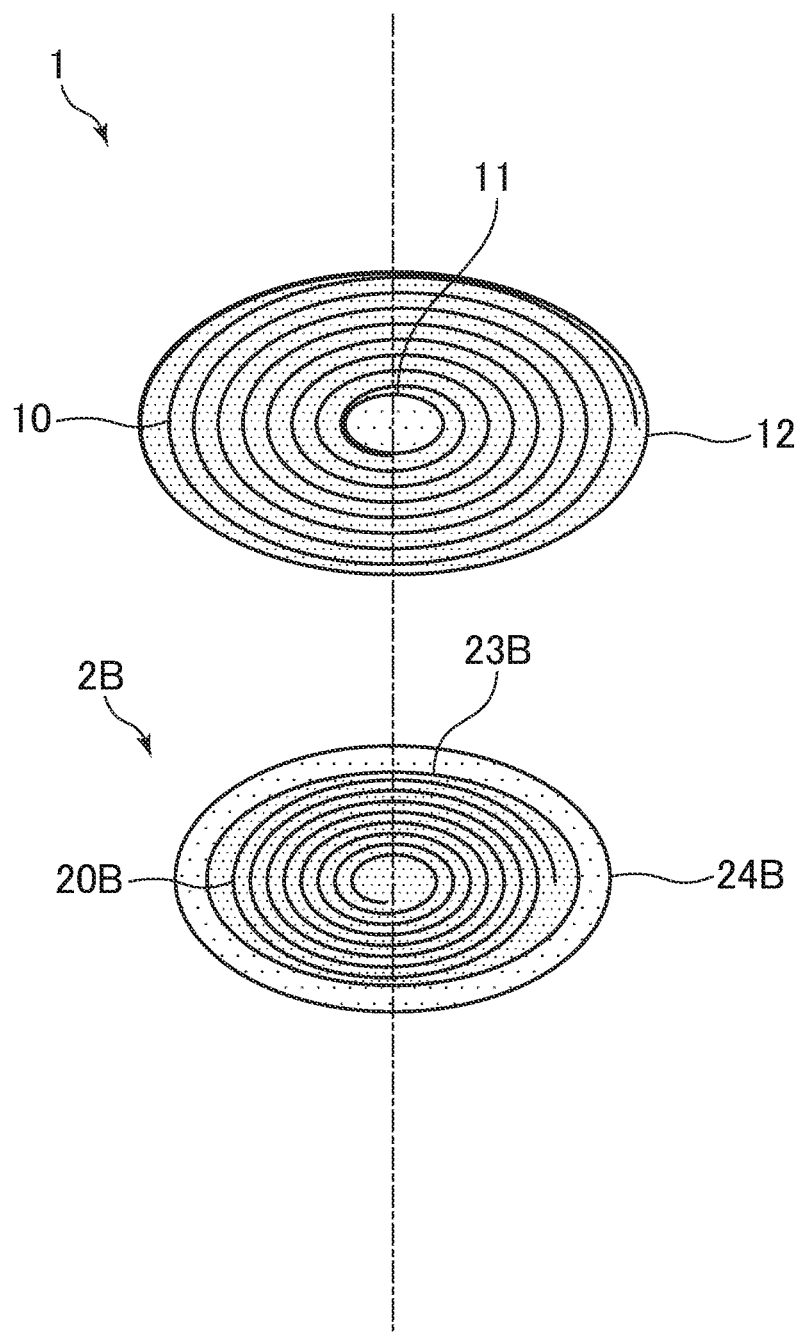
FIG. 10 is a schematic perspective view illustrating the light reduction unit of the second modification of the exemplary embodiment.

FIG. 10 is a schematic perspective view illustrating first light reduction unit 1 of the first modification of the exemplary embodiment and second light reduction unit 2B. In second modification of FIG. 10, each of first light reduction unit 1 and second light reduction unit 2B has a circular shape. The circular shape includes not only a true circle but also an ellipse. Circular first light reduction unit 1 includes first region 11 disposed in the center and second region 12 disposed around first region 11. Circular second light reduction unit 2B includes third region 23B disposed in the center and fourth region 24B disposed around third region 23B.

The second modification is different from the first modification in the configuration of the second light reduction unit 2B.

First light reduction unit 1 is configured such that the area of first region 11 disposed in the center is smaller than the area of the second region 12, and second light reduction unit 2B is configured such that the area of fourth region 24B disposed around third region 23B is smaller than the area of third region 23B.

In first light reduction unit 1, the transmittance to the visible light in first region 11 is higher than the transmittance to the visible light in second region 12. On the other hand, in the second modification, in second light reduction unit 2B, the transmittance to the visible light in fourth region 24B is higher than the transmittance to the visible light in third region 23B. First light reduction unit 1 of the second modification includes spiral first low transmittance region 10, and spiral first low transmittance region 10 is disposed in second region 12. On the other hand, second light reduction unit 2B includes spiral second low transmittance region 20B in third region 23B. Second low transmittance region 20B has the lower transmittance to the visible light as compared with other regions in third region 23B.

The irradiation of the laser beam is performed such that the focal point is formed within glass substrate GB, and the scanning is spirally performed with the laser beam from the inner circumferential side of second light reduction unit 2B to the outer circumferential side, which allows the formation of second light reduction unit 2B in FIG. 10. At this point, the irradiation of the laser beam is ended in fourth region 24B that is a circumferential portion of second light reduction unit 2B, so that the slight distortion is generated in fourth region 24B. For this reason, the transmittance to the visible light in fourth region 24B is slightly higher than the transmittance to the visible light in third region 23B.

As illustrated in FIG. 10, in the second modification, first light reduction unit 1 is disposed on the display surface side with respect to second light reduction unit 2B, and first region 11 of first light reduction unit 1 is disposed so as to overlap third region 23B of second light reduction unit 2B in planar view. Second region 12 of first light reduction unit 1 is disposed so as to overlap fourth region 24B of second light reduction unit 2B in planar view.

The degradation of the display quality due to the bright point defects can further be prevented by adopting the configuration. That is, first region 11 of first light reduction unit 1 and fourth region 24B of second light reduction unit 2B may include the distortion, and first region 11 and fourth region 24B are higher than second region 12 and third region 23B in the transmittance to the visible light. For this reason, first region 11 having the higher transmittance and third region 23B having the transmittance lower than that of first region 11 overlap each other in planar view, and fourth region 24B having the higher transmittance and second region 12 having the transmittance lower than that of fourth region 24B overlap each other in planar view, which allows the light generated due to bright point defect portion 133 to be prevented from exiting from first region 11 and fourth region 24B onto the display surface side.

Further, in the second modification, as illustrated in FIG. 10, a diameter of first light reduction unit 1 disposed on the display surface side is larger than a diameter of second light reduction unit 2B disposed on the rear surface side. With such a configuration, second region 12 of first light reduction unit 1 covers fourth region 24B of second light reduction unit 2B in planar view, so that the light that leaks from fourth region 24B can be prevented from exiting onto the display surface side.

(Third Modification)

Figure 11:
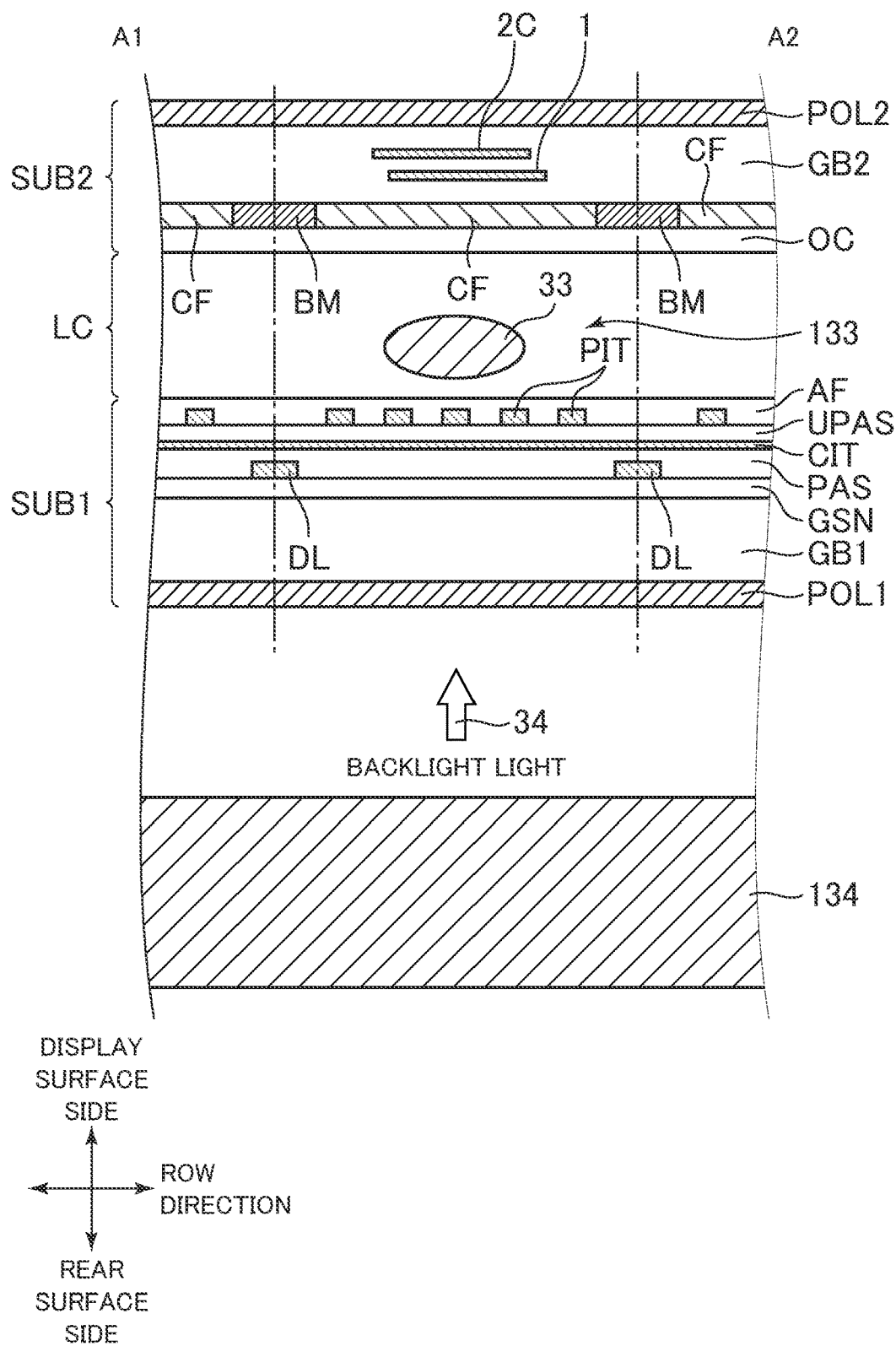
FIG. 11 illustrates a cross section view of pixels including a light reduction unit in liquid crystal display device according to third modification of the exemplary embodiment.

FIG. 11 illustrates another configuration that prevents the bright point defect in liquid crystal display device LCD according to a third modification of the exemplary embodiment.

In the third modification, second light reduction unit 2C is formed on the display surface side of the focal position during the formation of first light reduction unit 1. Second light reduction unit 2C is planarly disposed, and formed so as to cover bright point defect portion 133 caused by foreign matter 33 when viewed from the display surface side of second glass substrate GB2. That is, second light reduction unit 2C that covers bright point defect portion 133 when viewed from the display surface side is disposed in at least one of first glass substrate GB1 and second glass substrate GB2.

Figure 12:
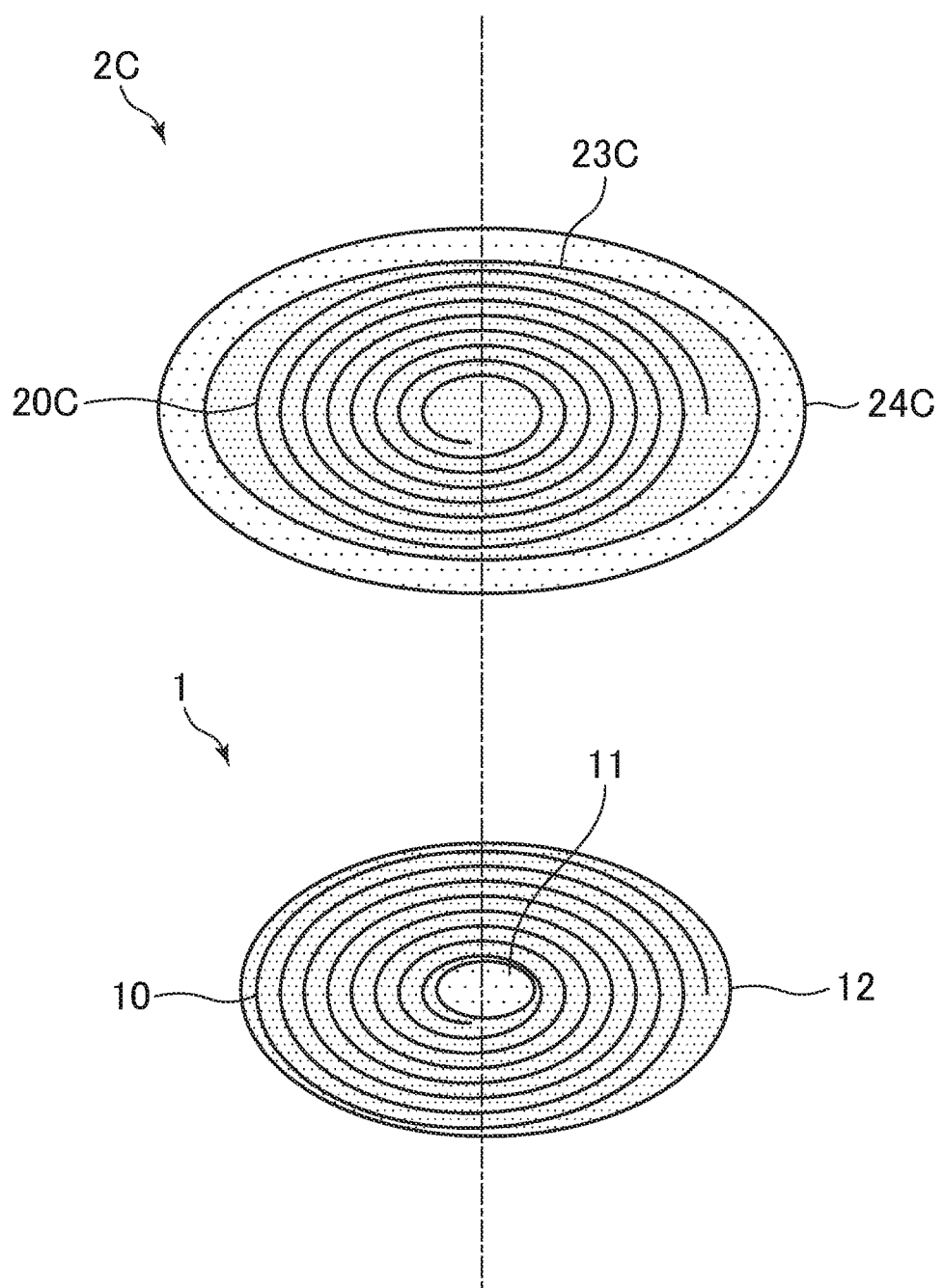
FIG. 12 is a schematic perspective view illustrating the light reduction unit of the third modification of the exemplary embodiment.

FIG. 12 is a schematic perspective view illustrating first light reduction unit 1 of the first modification of the exemplary embodiment and second light reduction unit 2C. In the third modification of FIG. 12, each of first reduction unit 1 and second reduction unit 2C has a circular shape. The circular shape includes not only a true circle but also an ellipse. The circular first light reduction unit 1 includes first region 11 disposed in the center and second region 12 disposed around first region 11. Circular second light reduction unit 2C includes third region 23C disposed in the center and fourth region 24C disposed around third region 23C.

In first light reduction unit 1, the area of first region 11 disposed in the center is smaller than the area of second region 12. On the other hand, in second reduction unit 2C, the area of fourth region 24C disposed around third region 23C is smaller than the area of third region 23C.

In first light reduction unit 1, the transmittance to the visible light in first region 11 is higher than the transmittance to the visible light in second region 12. On the other hand, in second light reduction unit 2C, the transmittance to the visible light in fourth region 24C is higher than the transmittance to the visible light in third region 23C. First light reduction unit 1 of the third modification includes spiral first low transmittance region 10, and spiral first low transmittance region 10 is disposed in second region 12. On the other hand, second light reduction unit 2C includes spiral second low transmittance region 20C in third region 23C. Second low transmittance region 20C has the lower transmittance to the visible light as compared with other regions in third region 23C.

The irradiation of the laser beam is performed such that the focal point is formed within glass substrate GB, and the scanning is spirally performed with the laser beam from the inner circumferential side of second light reduction unit 2C to the outer circumferential side, which allows the formation of second light reduction unit 2C in FIG. 12. At this point, the irradiation of the laser beam is ended in fourth region 24C that is a circumferential portion of second light reduction unit 2C, so that the slight distortion is generated in fourth region 24C. For this reason, the transmittance to the visible light in fourth region 24C is slightly higher than the transmittance to the visible light in third region 23C.

As illustrated in FIG. 12, in the third modification, second light reduction unit 2C is disposed on the display surface side with respect to first light reduction unit 1, and third region 23C of second light reduction unit 2C is disposed so as to overlap first region 11 of first light reduction unit 1 in planar view.

The degradation of the display quality due to the bright point defects can further be prevented by adopting the configuration. That is, first region 11 of first light reduction unit 1 may include the distortion, and first region 11 is higher than second region 12 in the transmittance to the visible light. For this reason, first region 11 having the higher transmittance and third region 23C having the transmittance lower than that of first region 11 overlap each other in planar view, which allows the light generated due to bright point defect portion 133 to be prevented from exiting from first region 11 onto the display surface side.

Further, in the third modification, as illustrated in FIG. 12, the diameter of second light reduction unit 2C disposed on the display surface side is larger than the diameter of first light reduction unit 1 disposed on the rear surface side. Furthermore, second region 23C where the transmittance can be decreased is configured to cover first light reduction unit 1 in planar view. Consequently, the light that leaks from first light reduction unit 1 can be prevented from exiting onto the display surface side.

[Method for Manufacturing Liquid Crystal Display Device]

A method for manufacturing liquid crystal display device LCD will be described below. As the method for manufacturing liquid crystal display device LCD, a description will be given of a method for manufacturing the display device including first glass substrate GB1 (first translucent substrate) and second glass substrate GB2 (second translucent substrate) that is located on the display surface side while opposed to first glass substrate GB1.

The method for manufacturing the display device according to the exemplary embodiment includes a step of preparing TFT substrate SUB1, a step of preparing CF substrate SUB2, a step of bonding TFT substrate SUB1 and CF substrate SUB2, a liquid crystal injecting step, a detection step of detecting the bright point defect portion of the pixel by performing a lighting inspection on display panel DP, and a step of repairing the bright point defect.

Among the above steps, a known method can be applied to the step of preparing TFT substrate SUB1, the step of preparing CF substrate SUB2, the step of bonding TFT substrate SUB1 and CF substrate SUB2, the liquid crystal injection step, and the detection step.

For example, the step of preparing TFT substrate SUB1 includes a step of forming gate line GL, data line DL, pixel electrode PIT, common electrode CIT, various insulators, and first polarizing plate POL1 on first glass substrate GB1. Pixel P defined by TFT substrate SUB1 may include red pixel Pr corresponding to red, green pixel Pg corresponding to green, and blue pixel Pb corresponding to blue. The step of manufacturing CF substrate SUB2 includes a step of forming black matrix BM, color filter CF, and second polarizing plate POL2 on second glass substrate GB2.

In the method for manufacturing the display device according to the exemplary embodiment, the detecting step and the bright point defect repairing step will be described below.

Figure 13:
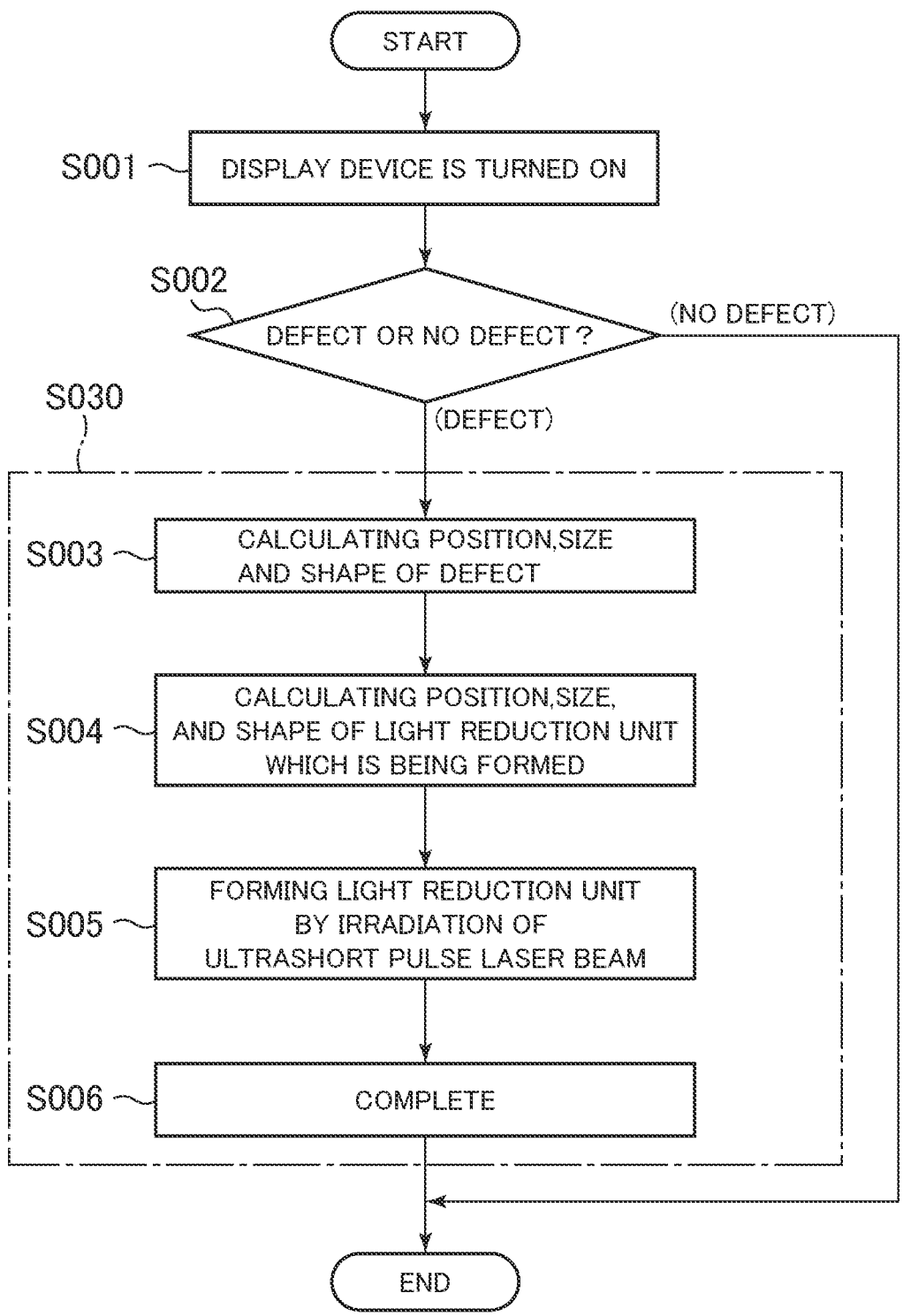
FIG. 13 is a flowchart of a method for repairing a bright point defect in a process of manufacturing liquid crystal display device of the exemplary embodiment.
Figure 14:
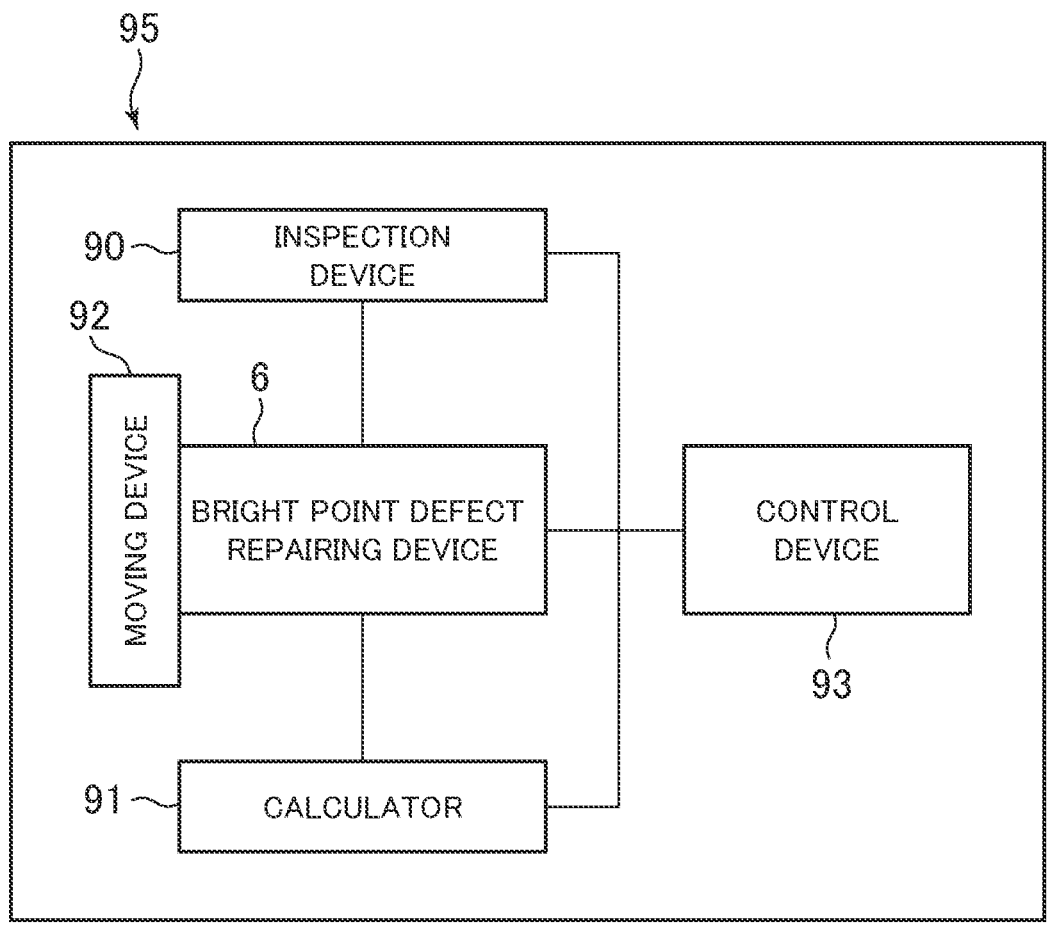
FIG. 14 is a block diagram illustrating display device manufacturing apparatus that can perform the method for repairing the bright point defect.

FIG. 13 is a flowchart of a method for repairing a bright point defect. FIG. 14 is a block diagram illustrating display device manufacturing apparatus 95 that can perform the method for repairing the bright point defect.

Display device manufacturing apparatus 95 includes at least inspection device 90 included in an inspection device that detects the bright point defect of the pixel by performing the lighting inspection on the display device and a bright point defect repairing device 6. Manufacturing apparatus 95 may further include control device 93 and calculator 91. Control device 93 controls operations of inspection device 90, calculator 91, and bright point defect repairing device 6. Calculator 91 performs a predetermined calculation as described later. Inspection device 90 includes an inspection optical system including a microscope.

On a detection step, inspection device 90 detects the bright point defect. For example, inspection device 90 lights all display panels DP or lights display panels DP line by line, and measures the luminance of each pixel (step S001). Alternatively, the display panel DP is set in the black display state, and the luminance of each pixel may be measured by emitting the backlight light 34 from the rear surface side of display panel DP.

Inspection device 90 detects the pixel in which the luminance exceeding a threshold is measured as the bright point defect portion 133 (pixel defect portion) (step S002). Inspection device 90 outputs positional information about the pixel detected as the bright point defect portion 133 to bright point defect repairing device 6 (to be described later). Bright point defect portion 133 may be visually detected by an operator.

In the case that bright point defect portion 133 is detected in step S002, the process proceeds to a bright point defect repairing step (step S030). When bright point defect portion 133 is not detected, the flowchart is ended.

Figure 15:
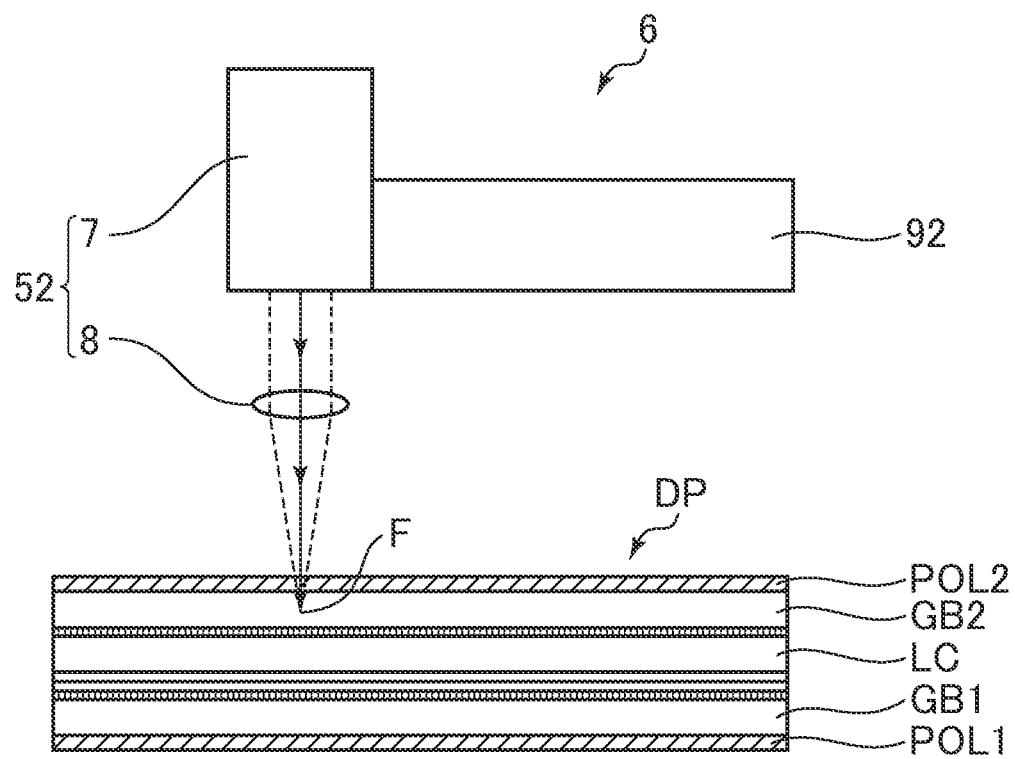
FIG. 15 illustrates a schematic configuration of bright point defect repairing device which is available in the process of manufacturing liquid crystal display device of the exemplary embodiment.
Figure 15:
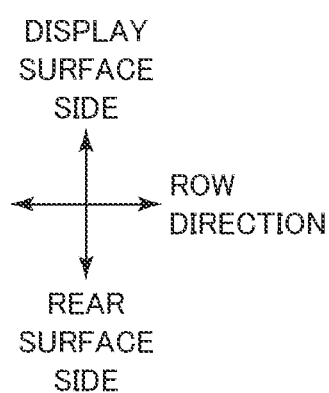

FIG. 15 illustrates a schematic configuration of bright point defect repairing device 6 that performs the bright point defect repairing step (step S030). Bright point defect repairing device 6 includes ultrashort pulse laser oscillation mechanism 7, irradiation optical system 52 including high condensing lens 8, and moving device 92 that moves the irradiation position of the laser beam of the irradiation optical system 52.

In the bright point defect repairing step (step S030), in the exemplary embodiment, a laser beam having a wavelength of 1552 nm and a pulse width of 800 fs is used as an example in ultrashort pulse laser oscillation mechanism 7.

The bright point defect repairing step (step S030) includes steps S003 to S006.

In the bright point defect repairing step (step S030), bright point defect repairing device 6 first acquires the positional information and shape information (for example, position, size, shape) about the pixel having the bright point defect from inspection device 90 (Step S003).

Subsequently, based on the acquired shape information, calculator 91 calculates the shape information and the positional information (for example, position, size, shape) of first light reduction unit 1 formed by the irradiation of ultrashort pulse laser beam 4 (Step S004).

Subsequently, under the control of control device 93, an optical system such as high condensing lens 8 of bright point defect repairing device 6 is positioned based on the positional information about first light reduction unit 1, the positional information being calculated by the calculator 91.

Subsequently, under the control of control device 93, bright point defect repairing device 6 adjusts the position of focal point F of ultrashort pulse laser beam 4 such that the position of focal point F is matched with a desired position in second glass substrate GB2. The position of focal point F is adjusted based on, for example, a size of the foreign matter causing the bright point defect or a measured luminance value. For example, as illustrated in FIG. 14, the adjustment is performed such that the position of focal point F of ultrashort pulse laser beam 4 is matched with the side close to foreign matter 33 in second glass substrate GB2.

Subsequently, under the control of control device 93, the bright point defect repairing device 6 causes ultrashort pulse laser oscillation mechanism 7 to emit ultrashort pulse laser beam 4. Consequently, ultrashort pulse laser beam 4 emitted from ultrashort pulse laser oscillation mechanism 7 is focused and irradiated on focal point F in second glass substrate GB2 through high condensing lens 8.

Under the control of control device 93, ultrashort pulse laser beam 4 is continuously emitted while the irradiation position (first irradiation position) of ultrashort pulse laser beam 4 is moved by moving device 92 (first irradiation step), thereby forming first light reduction unit 1 (step S005). Through step S005, the bright point defect repairing step (step S030) is completed (step S006).

In the first irradiation step, the irradiation is performed with ultrashort pulse laser beam 4 focused on the first irradiation position in at least one of first glass substrate GB1 and second glass substrate GB2, thereby forming first light reduction unit 1 that covers bright point defect portion 133 when viewed from the display surface side as illustrated in FIGS. 5 and 6. The irradiation of the laser beam is performed such that the focal point is formed within glass substrate GB, and the scanning is spirally performed with the laser beam from the outer circumferential side of first light reduction unit 1 to the inner circumferential side, which allows the formation of first light reduction unit 1. At this point, the irradiation of the laser beam is ended in first region 11 that is the central portion of first light reduction unit 1, so that the slight distortion is generated in first region 11. For this reason, the transmittance to the visible light in first region 11 is slightly higher than the transmittance to the visible light in second region 12.

The area of the region where the distortion is generated can be suppressed to a minimum level by adopting the manufacturing method of the present disclosure. For example, after the scanning is performed with the laser beam in a first direction, the scanning direction with the laser beam is turned back in an opposite direction to the first direction, and the scanning with the laser beam is performed in the opposite direction. In repeating the scanning, the distortion is generated in all the turn-back regions relating to the scanning with the laser beam. On the other hand, by adopting the manufacturing method of the present disclosure, the region where the distortion is generated can be concentrated in first region 11 that is the central region of the first light reduction unit. As a result, the degradation of the display quality due to the bright point defect can be prevented.

Desirably the first irradiation step includes a first intensity irradiation step of irradiating the irradiation position with the energy beam having first irradiation intensity and a second intensity irradiation step of irradiating the irradiation position the energy beam having second irradiation intensity lower than the first irradiation intensity after the first intensity irradiation step. That is, in timing of forming second region 12 by performing the irradiation of the laser beam from the outer circumferential side of first light reduction unit 1, the decrease in transmittance in second region 12 is effective by performing the irradiation of the laser beam having a certain degree of intensity. On the other hand, at the timing of irradiation onto first region 11 where the distortion is easily generated, first region 11 being an end position of the laser beam irradiation, the decreasing in irradiation intensity of the laser beam can prevent the generation of the distortion, and prevent the light from leaking from the bright point defect portion in first region 11.

(First Modification)

In a first modification, in addition to the first irradiation step, step S005 above described includes a second irradiation step of performing the irradiation of ultrashort pulse laser beam 4 under the control of the control device 93 while focusing ultrashort pulse laser beam 4 on a position (rear surface side) deeper than the focal position during the formation of first light reduction unit 1. Second light reduction unit 2 is formed through the second irradiation step.

In the second irradiation step, the irradiation is performed with ultrashort pulse laser beam 4 focused on the first irradiation position in at least one of first glass substrate GB1 and second glass substrate GB2, thereby forming second light reduction unit 2 that covers bright point defect portion 133 when viewed from the display surface side as illustrated in FIGS. 7 and 8. The irradiation of the laser beam is performed such that the focal point is formed within glass substrate GB, and the scanning is spirally performed with the laser beam from the outer circumferential side of second light reduction unit 2 to the inner circumferential side, which allows the formation of second light reduction unit 2. At this point, the irradiation of the laser beam is ended in third region 23A that is a central portion of second light reduction unit 2, so that the slight distortion is generated in third region 23A. For this reason, the transmittance to the visible light in third region 23A is slightly higher than the transmittance to the visible light in fourth region 24A.

As illustrated in FIG. 8, in the first modification, first light reduction unit 1 is disposed on the display surface side with respect to second light reduction unit 2, and a center axis of first light reduction unit 1 is disposed so as not to overlap a center axis of second light reduction unit 2 in planar view. More specifically, in planar view, first region 11 of first light reduction unit 1 does not overlap third region 23A of second light reduction unit 2, first region 11 of first light reduction unit 1 overlaps fourth region 24A of second light reduction unit 2, and third region 23A of second light reduction unit 2 overlaps second region 12 of first light reduction unit 1.

In this way, the configuration in which the center axis of first light reduction unit 1 and the center axis of second light reduction unit 2 do not overlap each other can be implemented by a method in which the irradiation end position of the laser beam in the first irradiation step and the irradiation end position of the laser beam in the second irradiation step do not overlap each other in planar view. For example, in the case that the second irradiation step is performed after the first irradiation step, the irradiation of the second irradiation step is ended at the position overlapping second region 12 of first light reduction unit 1 formed through the first irradiation step in planar view, which allows the implementation of the configuration in which first region 11 of first light reduction unit 1 and third region 23A of second light reduction unit 2 do not overlap each other. In the case that the first irradiation step is performed after the second irradiation step, the irradiation of the first irradiation step is ended at the position overlapping fourth region 24A of second light reduction unit 2 formed through the second irradiation step in planar view, which allows the implementation of the configuration in which first region 11 of first light reduction unit 1 and third region 23A of second light reduction unit 2 do not overlap each other in planar view.

The degradation of the display quality due to the bright point defects can further be prevented by adopting the manufacturing method. That is, first region 11 of first light reduction unit 1 and third region 23A of second light reduction unit 2 may include the distortion, and first region 11 and third region 23A are higher than second region 12 and fourth region 24A in the transmittance to the visible light. For this reason, first region 11 having the higher transmittance and fourth region 24A having the transmittance lower than that of first region 11 overlap each other in planar view, and third region 23A having the higher transmittance and second region 12 having the transmittance lower than that of third region 23A overlap each other in planar view, which allows the light generated due to bright point defect portion 133 to be prevented from exiting from first region 11 and third region 23A onto the display surface side.

Desirably the first irradiation step and the second irradiation step include a first intensity irradiation step of irradiating the irradiation position with the energy beam having first irradiation intensity and a second intensity irradiation step of irradiating the irradiation position the energy beam having second irradiation intensity lower than the first irradiation intensity after the first intensity irradiation step. That is, in timing of forming second region 12 and fourth region 24A by performing the irradiation of the laser beam from the outer circumferential side of first light reduction unit 1 and second light reduction unit 2, respectively, the decrease in transmittance in second region 12 and fourth region 24A is effective by performing the irradiation of the laser beam having a certain degree of intensity. On the other hand, at the timing of irradiation onto first region 11 and third region 23A where the distortion is easily generated, first region 11 and third region 23A being the end position of the laser beam irradiation, the decreasing in irradiation intensity of the laser beam can prevent the generation of the distortion, and prevent the light from leaking from the bright point defect portion in first region 11 and third region 23A.

(Second Modification)

In a second modification, in addition to the first irradiation step, step S005 above described includes the second irradiation step of performing the irradiation of ultrashort pulse laser beam 4 under the control of the control device 93 while focusing ultrashort pulse laser beam 4 on a position (rear surface side) deeper than the focal position during the formation of first light reduction unit 1. Second light reduction unit 2B is formed through the second irradiation step.

In the second irradiation step, the irradiation is performed with ultrashort pulse laser beam 4 focused at the first irradiation position in at least one of first glass substrate GB1 and second glass substrate GB2, thereby forming second light reduction unit 2B that covers bright point defect portion 133 when viewed from the display surface side as illustrated in FIGS. 9 and 10. The irradiation of the laser beam is performed such that the focal point is formed within glass substrate GB, and the scanning is spirally performed with the laser beam from the inner circumferential side of second light reduction unit 2B to the outer circumferential side, which allows the formation of second light reduction unit 2B. At this point, the irradiation of the laser beam is ended in fourth region 24B that is a circumferential portion of second light reduction unit 2B, so that the slight distortion is generated in fourth region 24B. For this reason, the transmittance to the visible light in fourth region 24B is slightly higher than the transmittance to the visible light in third region 23B.

As illustrated in FIG. 10, in the second modification, first light reduction unit 1 is disposed on the display surface side with respect to second light reduction unit 2B, and first region 11 of first light reduction unit 1 is disposed so as to overlap third region 23B of second light reduction unit 2B in planar view. Second region 12 of first light reduction unit 1 is disposed so as to overlap fourth region 24B of second light reduction unit 2B in planar view.

In this way, in order implement the configuration in which first region 11 of first light reduction unit 1 and third region 23B of second light reduction unit 2B overlap each other, for example, in the case that the second irradiation step is performed after the first irradiation step, the irradiation of the second irradiation step is started at the position overlapping first region 11 of first light reduction unit 1 formed through the first irradiation step in planar view, which allows the implementation of the configuration in which first region 11 of first light reduction unit 1 and third region 23B of second light reduction unit 2B overlap each other in planar view. In the case that the first irradiation step is performed after the second irradiation step, the irradiation of the first irradiation step is started at the position overlapping fourth region 24B of second light reduction unit 2B formed through the second irradiation step in planar view, which allows the implementation of the configuration in which second region 12 of first light reduction unit 1 and fourth region 24B of second light reduction unit 2B overlap each other in planar view.

The degradation of the display quality due to the bright point defects can further be prevented by adopting the manufacturing method. That is, first region 11 of first light reduction unit 1 and fourth region 24B of second light reduction unit 2B may include the distortion, and first region 11 and fourth region 24B are higher than second region 12 and third region 23B in the transmittance to the visible light. For this reason, first region 11 having the higher transmittance and third region 23B having the transmittance lower than that of first region 11 overlap each other in planar view, and fourth region 24B having the higher transmittance and second region 12 having the transmittance lower than that of fourth region 24B overlap each other in planar view. With this configuration, the light generated due to bright point defect portion 133 can be prevented from exiting from first region 11 and fourth region 24B onto the display surface side.

Further, in the second modification, as illustrated in FIG. 10, the diameter of first light reduction unit 1 disposed on the display surface side is larger than the diameter of second light reduction unit 2B disposed on the rear surface side. With such a configuration, second region 12 of first light reduction unit 1 covers fourth region 24B of second light reduction unit 2B in planar view, so that the light that leaks from fourth region 24B can be prevented from exiting onto the display surface side.

In order to implement the configuration in which the diameter of first light reduction unit 1 disposed on the display surface side is larger than the diameter of second light reduction unit 2B disposed on the rear surface side, for example, in the case that the second irradiation step is performed after the first irradiation step, the irradiation of the spiral laser beam is ended in the second irradiation step on the inner circumferential side of the outer shape of first light reduction unit 1 formed through the first irradiation step. In the case that the first irradiation step is performed after the second irradiation step, the irradiation of the spiral laser beam is started in the first irradiation step from the outer circumferential side of the outer shape of second light reduction unit 2B formed through the second irradiation step.

Desirably the first irradiation step and the second irradiation step respectively include the first intensity irradiation step of irradiating the irradiation position with the energy beam having first irradiation intensity and the second intensity irradiation step of irradiating the irradiation position the energy beam having second irradiation intensity lower than the first irradiation intensity after the first intensity irradiation step. That is, in timing of forming second region 12 by performing the irradiation of the laser beam from the outer circumferential side of first light reduction unit 1, and in timing of forming third region 23B by performing the irradiation of the laser beam from the inner circumferential side of second light reduction unit 2B, the decrease in transmittance in second region 12 and third region 23B is effective by performing the irradiation of the laser beam having a certain degree of intensity. On the other hand, at the timing of irradiation onto first region 11 and fourth region 24B where the distortion is easily generated, first region 11 and fourth region 24B being the end position of the laser beam irradiation, the decreasing in irradiation intensity of the laser beam can prevent the generation of the distortion, and prevent the light from leaking from the bright point defect portion in first region 11 and fourth region 24B.

(Third Modification)

In a third modification, in addition to the first irradiation step, step S005 above described includes the second irradiation step of performing the irradiation of ultrashort pulse laser beam 4 under the control of the control device 93 while focusing ultrashort pulse laser beam 4 on the display surface side with respect to the focal position during the formation of first light reduction unit 1. Second light reduction unit 2C is formed through the second irradiation step.

In the second irradiation step, the irradiation is performed with ultrashort pulse laser beam 4 focused at the first irradiation position in at least one of first glass substrate GB1 and second glass substrate GB2, thereby forming second light reduction unit 2C that covers bright point defect portion 133 when viewed from the display surface side as illustrated in FIGS. 11 and 12. The irradiation of the laser beam is performed such that the focal point is formed within glass substrate GB, and the scanning is spirally performed with the laser beam from the inner circumferential side of second light reduction unit 2C to the outer circumferential side, which allows the formation of second light reduction unit 2C. At this point, the irradiation of the laser beam is ended in fourth region 24C that is a circumferential portion of second light reduction unit 2C, so that the slight distortion is generated in fourth region 24C. For this reason, the transmittance to the visible light in fourth region 24C is slightly higher than the transmittance to the visible light in third region 23C.

As illustrated in FIG. 12, in the third modification, second light reduction unit 2C is disposed on the display surface side with respect to first light reduction unit 1, and first region 11 of first light reduction unit 1 is disposed so as to overlap third region 23C of second light reduction unit 2C in planar view.

In this way, in order implement the configuration in which first region 11 of first light reduction unit 1 and third region 23C of second light reduction unit 2C overlap each other, for example, in the case that the second irradiation step is performed after the first irradiation step, the irradiation of the second irradiation step is started at the position overlapping first region 11 of first light reduction unit 1 formed through the first irradiation step in planar view, which allows the implementation of the configuration in which first region 11 of first light reduction unit 1 and third region 23C of second light reduction unit 2C overlap each other in planar view.

The degradation of the display quality due to the bright point defects can further be prevented by adopting the manufacturing method. That is, first region 11 of first light reduction unit 1 may include the distortion, and first region 11 is higher than second region 12 and third region 23C in the transmittance to the visible light. For this reason, first region 11 having the higher transmittance and third region 23C having the transmittance lower than that of first region 11 overlap each other in planar view, which allows the light generated due to bright point defect portion 133 to be prevented from exiting from first region 11 onto the display surface side.

Further, in the third modification, as illustrated in FIG. 12, the diameter of second light reduction unit 2C disposed on the display surface side is larger than the diameter of first light reduction unit 1 disposed on the rear surface side. In addition, third region 23C of second light reduction unit 2C covers first light reduction unit 1 in planar view. Thus, the light that leaks from first light reduction unit 1 can be prevented from exiting onto the display surface side.

In order to implement the configuration in which the diameter of second light reduction unit 2C disposed on the display surface side is larger than the diameter of first light reduction unit 1 disposed on the rear surface side, for example, in the case that the second irradiation step is performed after the first irradiation step, the irradiation of the spiral laser beam is continued in the second irradiation step to the outer circumferential side of the outer shape of first light reduction unit 1 formed through the first irradiation step. In the case that the first irradiation step is performed after the second irradiation step, the irradiation of the spiral laser beam is started in the first irradiation step from the inner circumferential side of the outer shape of second light reduction unit 2C formed through the second irradiation step.

Desirably the first irradiation step and the second irradiation step respectively include the first intensity irradiation step of irradiating the irradiation position with the energy beam having first irradiation intensity and the second intensity irradiation step of irradiating the irradiation position the energy beam having second irradiation intensity lower than the first irradiation intensity after the first intensity irradiation step. That is, in timing of forming second region 12 by performing the irradiation of the laser beam from the outer circumferential side of first light reduction unit 1, and in timing of forming third region 23C by performing the irradiation of the laser beam from the inner circumferential side of second light reduction unit 2C, the decrease in transmittance in second region 12 and third region 23C is effective by performing the irradiation of the laser beam having a certain degree of intensity. On the other hand, at the timing of irradiation onto first region 11 and fourth region 24C where the distortion is easily generated, first region 11 and fourth region 24C being the end position of the laser beam irradiation, the decreasing in irradiation intensity of the laser beam can prevent the generation of the distortion, and prevent the light from leaking from the bright point defect portion in first region 11 and fourth region 24C.

In the above description, the bright point defects are illustrated in the case that foreign matter 33 are mixed between TFT substrate SUB1 and CF substrate SUB2. However, the cause of the bright point defect is not limited to the case that foreign matter 33 are mixed between TFT substrate SUB1 and CF substrate SUB2. For example, light leakage due to a defect of thin film transistor TFT or light leakage due to a spacer disposed between the substrates may be generated. The bright point defect repairing method according to the method for manufacturing the liquid crystal display device in the present disclosure can also be applied to these bright point defects.

The position where foreign matter 33, which may cause the bright point defect, is mixed is not limited to the position between TFT substrate SUB1 and CF substrate SUB2. For example, the bright point defects may be generated even if foreign matter 33 is mixed between first glass substrate GB1 and first polarizing plate POL1. In this case, first light reduction unit 1 and second light reduction units 2, 2B, 2C may be formed near foreign matter 33 in first glass substrate GB1. The bright point defects may be generated even when foreign matter 33 is mixed between second glass substrate GB2 and second polarizing plate POL2. In this case, first light reduction unit 1 and second light reduction units 2, 2B, 2C may be formed near foreign matter 33 in second glass substrate GB2. In this way, foreign matter 33 may be mixed into an unspecified position of display panel DP. For this reason, in one display panel DP, in the case that foreign matter 33 causing the bright point defect is mixed in the position (first position) between first glass substrate GB1 and first polarizing plate POL1 and the position (second position) between second glass substrate GB2 and second polarizing plate POL2, the first light reduction unit 1 may be formed near foreign matter 33 in first glass substrate GB1 according to foreign matter 33 at the first position, and second light reduction units 2, 2B, 2C may be formed near foreign matter 33 in second glass substrate GB2 according to foreign matter 33 at the second position. In this case, in consideration of working efficiency of the bright point defect repairing step, first light reduction unit 1 and the second light reduction units 2, 2B, 2C may be formed on the display surface side of second glass substrate GB2. First reduction unit 1 and second reduction units 2, 2B, 2C may be formed so as to have different transmittances.

Although the exemplary embodiment of the present disclosure is described above, the present disclosure is not limited to the exemplary embodiment. Various modifications of the exemplary embodiment appropriately made by those skilled in the art without departing from the scope of the present disclosure are also included in the technical scope of the present disclosure.

By appropriately combining the above exemplary embodiment and any one of the above modifications, it is possible to obtain each of the effects of the above exemplary embodiment and the above modifications. The combinations of the modifications, the combinations of the exemplary embodiment and the modifications, or the combinations of the features in the exemplary embodiment and different modifications can also be made.

What is claimed is:

1. A display device comprising:
   a first translucent substrate;
   a second translucent substrate that is disposed on a display surface side while opposed to the first translucent substrate; and
   a first light reduction unit that reduces a transmission amount of visible light while overlapping a bright point defect portion in planar view in at least one of the first translucent substrate and the second translucent substrate,
   wherein the first light reduction unit has a circular shape including a first region disposed in a center and a second region disposed around the first region, and
   transmittance to the visible light in the first region is higher than transmittance to the visible light in the second region.

2. The display device according to claim 1, wherein
   the second region includes a spiral first low transmittance region, and
   the transmittance to the visible light in the first low transmittance region is lower than the transmittance to the visible light in other regions of the second region.

3. The display device according to claim 1, further comprising a second light reduction unit that is provided in the second translucent substrate to reduce the transmission amount of the visible light,
   wherein
   the first light reduction unit is provided in the second translucent substrate,
   the second light reduction unit has a circular shape including a third region disposed in the center and a fourth region disposed around the third region,
   the transmittance to the visible light in the third region is higher than the transmittance to the visible light in the fourth region, and
   the first region and the fourth region overlap each other in planar view while the second region and the third region overlap each other in planar view.

4. The display device according to claim 3, wherein
   the second region includes a spiral first low transmittance region,
   the fourth region includes a spiral second low transmittance region,
   the transmittance to the visible light in the first low transmittance region is lower than the transmittance to the visible light in other regions of the second region, and
   the transmittance to the visible light in the second low transmittance region is lower than the transmittance to the visible light in other regions of the fourth region.

5. The display device according to claim 1, further comprising a second light reduction unit that is provided in the second translucent substrate to reduce the transmission amount of the visible light,
   wherein
   the first light reduction unit is provided in the second translucent substrate,
   the second light reduction unit has a circular shape including a third region disposed in the center and a fourth region disposed around the third region,
   the transmittance to the visible light in the fourth region is higher than the transmittance to the visible light in the third region, and
   the second light reduction unit overlaps at least a part of the first light reduction unit in planar view.

6. The display device according to claim 5, wherein
   the first light reduction unit is disposed closer to the display surface side than the second light reduction unit, and
   a diameter of the first light reduction unit is larger than a diameter of the second light reduction unit.

7. The display device according to claim 5, wherein
   the second light reduction unit is disposed closer to the display surface side than the first light reduction section, and
   a diameter of the second light reduction unit is larger than a diameter of the first light reduction unit.

8. The display device according to claim 5, wherein
   the second region includes a spiral first low transmittance region,
   the third region includes a spiral second low transmittance region,
   the transmittance to the visible light in the first low transmittance region is lower than the transmittance to the visible light in other regions of the second region, and
   the transmittance to the visible light in the second low transmittance region is lower than the transmittance to the visible light in other regions of the third region.

9. The display device according to claim 5, wherein the first region and the third region overlap each other in planar view.

10. The display device according to claim 1, further comprising a liquid crystal layer that is disposed between the first translucent substrate and the second translucent substrate and includes the bright point defect portion.

11. A method for manufacturing a display device including a first translucent substrate and a second translucent substrate that is disposed on a display surface side while opposed to the first translucent substrate, the method comprising:
   a detection step of detecting a bright point defect portion of a pixel by performing lighting inspection of the display device; and a first irradiation step of performing irradiation of an energy beam focused on an inside of at least one of the first translucent substrate and the second translucent substrate,
wherein in the first irradiation step, a circular first light reduction unit that covers the bright point defect portion when the first light reduction unit is viewed from a display surface side is formed by performing spiral scanning with the energy beam.

12. The method for manufacturing a display device according to claim 11, wherein in the first irradiation step, the scanning is performed with the energy beam from an outer circumferential side to an inner circumferential side.

13. The method for manufacturing a display device according to claim 12, further comprising a second irradiation step of performing irradiation of the energy beam focused on an inside of the second translucent substrate while performing the spiral scanning with the energy beam, and forming a second light reduction unit,
wherein
in the first irradiation step, the irradiation of the energy beam is performed such that the energy beam is focused on the inside of the second translucent substrate,
a focal position of the energy beam in the first irradiation step is closer to the display surface side than a focal position of the energy beam in the second irradiation step, and
the first light reduction unit overlaps at least a part of the second light reduction unit in planar view.

14. The method for manufacturing a display device according to claim 13, wherein
in the second irradiation step, scanning is performed with the energy beam from an outer circumferential side to an inner circumferential side, and
an irradiation end position in the first irradiation step and an irradiation end position in the second irradiation step do not overlap each other in planar view.

15. The method for manufacturing a display device according to claim 13, wherein in the second irradiation step, scanning is performed with the energy beam from an inner circumferential side to an outer circumferential side.

16. The method for manufacturing a display device according to claim 15, wherein
the focal position of the energy beam in the first irradiation step is closer to the display surface side than the focal position of the energy beam in the second irradiation step, and
a diameter of the first light reduction unit is larger than a diameter of the second light reduction unit.

17. The method for manufacturing a display device according to claim 15, wherein
the focal position of the energy beam in the second irradiation step is closer to the display surface side than the focal position of the energy beam in the first irradiation step, and
a diameter of the second light reduction unit is larger than a diameter of the first light reduction unit.

18. The method for manufacturing a display device according to claim 11, wherein
the first irradiation step includes:
a first intensity irradiation step of performing irradiation of the energy beam having first irradiation intensity; and
a second intensity irradiation step of performing irradiation of the energy beam having second irradiation intensity weaker than the first irradiation intensity after the first intensity irradiation step.

* * * * *